(12) United States Patent
Oota et al.

(10) Patent No.: US 11,571,880 B2
(45) Date of Patent: Feb. 7, 2023

(54) INTERLAYER FILM FOR LAMINATED GLASS, AND LAMINATED GLASS

(71) Applicant: SEKISUI CHEMICAL CO., LTD., Osaka (JP)

(72) Inventors: Yuusuke Oota, Kouka (JP); Kazuhiko Nakayama, Kouka (JP); Kinryou Chou, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 13 days.

(21) Appl. No.: 16/760,821

(22) PCT Filed: Dec. 18, 2018

(86) PCT No.: PCT/JP2018/046567
§ 371 (c)(1),
(2) Date: Apr. 30, 2020

(87) PCT Pub. No.: WO2019/124372
PCT Pub. Date: Jun. 27, 2019

(65) Prior Publication Data
US 2020/0276794 A1 Sep. 3, 2020

(30) Foreign Application Priority Data
Dec. 19, 2017 (JP) .............................. JP2017-243265

(51) Int. Cl.
*B32B 17/10* (2006.01)
*B32B 3/26* (2006.01)
(Continued)

(52) U.S. Cl.
CPC .......... *B32B 17/10761* (2013.01); *B32B 3/26* (2013.01); *B32B 3/263* (2013.01);
(Continued)

(58) Field of Classification Search
CPC ........ B32B 17/10761; B32B 17/10036; B32B 17/10568; B32B 17/10605; B32B 3/26;
(Continued)

(56) References Cited

U.S. PATENT DOCUMENTS 11,186,068 B2 11/2021 Nishino et al.
2007/0172642 A1 7/2007 Fukatani et al.
(Continued)

FOREIGN PATENT DOCUMENTS

CN 1964928 A 5/2007
CN 102260050 A 11/2011
(Continued)

OTHER PUBLICATIONS

International Search Report for the Application No. PCT/JP2018/046567 dated Mar. 19, 2019.
(Continued)

*Primary Examiner* — Catherine A. Simone
(74) *Attorney, Agent, or Firm* — Cheng Law Group, PLLC

(57) ABSTRACT

Provided is an interlayer film for laminated glass capable of suppressing double images, and making the moisture resistance of the laminated glass exposed to high temperature and high humidity uniform at one end and the other end of the interlayer film. The interlayer film for laminated glass according to the present invention is an interlayer film for laminated glass, being wedge-like shaped and containing an amphiphile or a surfactant, and when a high temperature and high humidity test for laminated glass is executed, a whitening distance at the one end and the other end of the interlayer film is 15 mm or less, and when a whitening distance at the one end of the interlayer film is more than 0 mm, a value of (whitening distance at the other end of the interlayer film×thickness of the other end of the interlayer
(Continued)

film)/(whitening distance at the one end of the interlayer film×thickness of the one end of the interlayer film) is 0.70 or more.

16 Claims, 7 Drawing Sheets

(51) Int. Cl.
  *B32B 27/22*     (2006.01)
  *B32B 27/30*     (2006.01)

(52) U.S. Cl.
  CPC .... *B32B 17/1011* (2013.01); *B32B 17/10036* (2013.01); *B32B 17/10568* (2013.01); *B32B 17/10605* (2013.01); *B32B 27/22* (2013.01); *B32B 27/30* (2013.01); *B32B 2307/304* (2013.01); *B32B 2457/20* (2013.01); *B32B 2605/006* (2013.01)

(58) Field of Classification Search
  CPC ......... B32B 3/263; B32B 27/22; B32B 27/30; B32B 2307/304; B32B 2457/20; B32B 2605/006; Y10T 428/24479; Y10T 428/24942; Y10T 428/2495
  USPC ........................................ 428/156, 212, 213
  See application file for complete search history.

(56) References Cited

U.S. PATENT DOCUMENTS

| | | | |
|---|---|---|---|
| 2008/0176043 A1* | 7/2008 | Masaki | B32B 17/10036 |
| | | | 428/172 |
| 2010/0040868 A1 | 2/2010 | Fukatani et al. | |
| 2013/0295393 A1 | 11/2013 | Fukatani et al. | |
| 2014/0295192 A1 | 10/2014 | Fukatani et al. | |
| 2016/0168353 A1* | 6/2016 | Spangler | B32B 17/10761 |
| | | | 428/172 |
| 2018/0272661 A1 | 9/2018 | Nishino et al. | |

FOREIGN PATENT DOCUMENTS

| | | |
|---|---|---|
| EP | 1 785 404 A1 | 5/2007 |
| EP | 3 392 222 A1 | 10/2018 |
| EP | 3 438 067 A1 | 2/2019 |
| JP | 4-502525 A | 5/1992 |
| JP | 2014-166959 A | 9/2014 |
| TW | 201731686 A | 9/2017 |
| WO | WO-91/06031 A1 | 5/1991 |
| WO | WO-2006/004162 A1 | 1/2006 |
| WO | WO-2015/147218 A1 | 10/2015 |
| WO | WO-2017/057625 A1 | 4/2017 |
| WO | WO-2017/170728 A1 | 10/2017 |

OTHER PUBLICATIONS

Written Opinion of the International Searching Authority (PCT/ISA/237) for Application No. PCT/JP2018/046567 dated Mar. 19, 2019.
Written Opinion of the International Searching Authority (PCT/ISA/237) for the Application No. PCT/JP2018/046567 dated Mar. 19, 2019 (English Translation mailed Jul. 2, 2020).
Supplementary European Search Report for the Application No. 18 892 945.9 dated Aug. 17, 2021.
Taiwanese Office Action for the Application No. 107145935 dated Apr. 7, 2022.
First Office Action for the Application No. 201880067807.3 from The State Intellectual Property Office of the People's Repubiic of China dated Feb. 22, 2022.

\* cited by examiner

[FIG. 1]
(a)
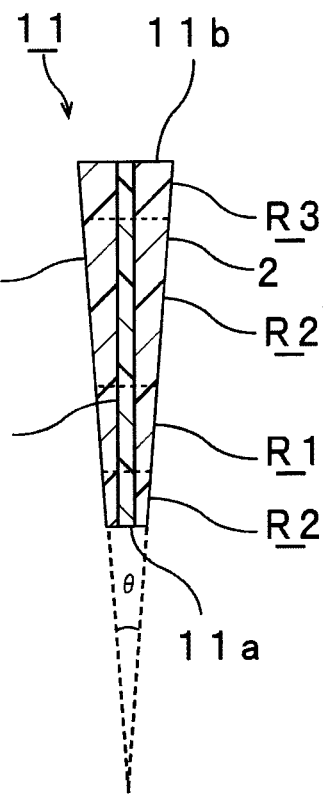
(b)
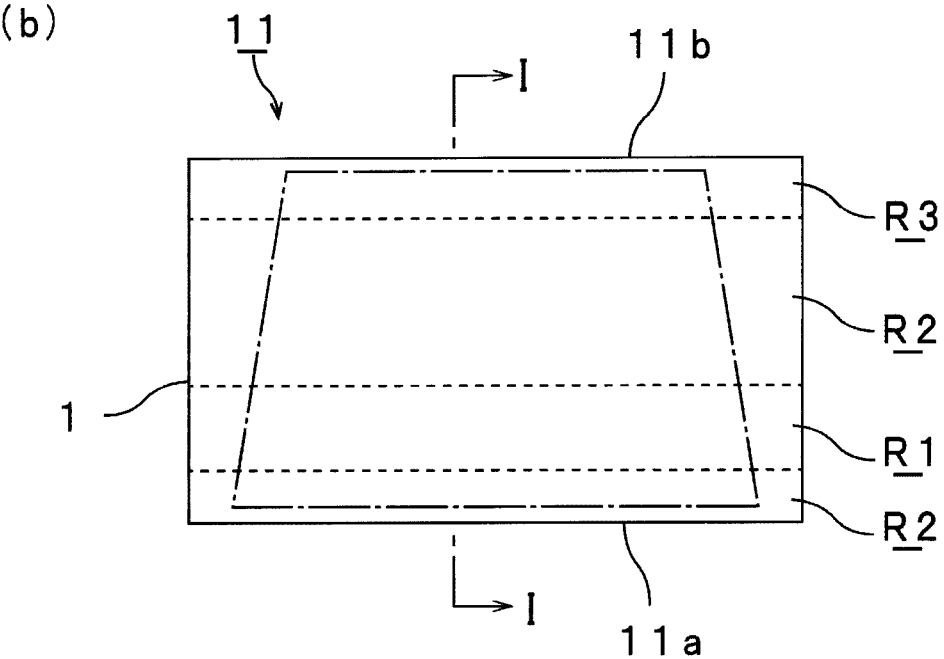

[FIG. 2]
(a)
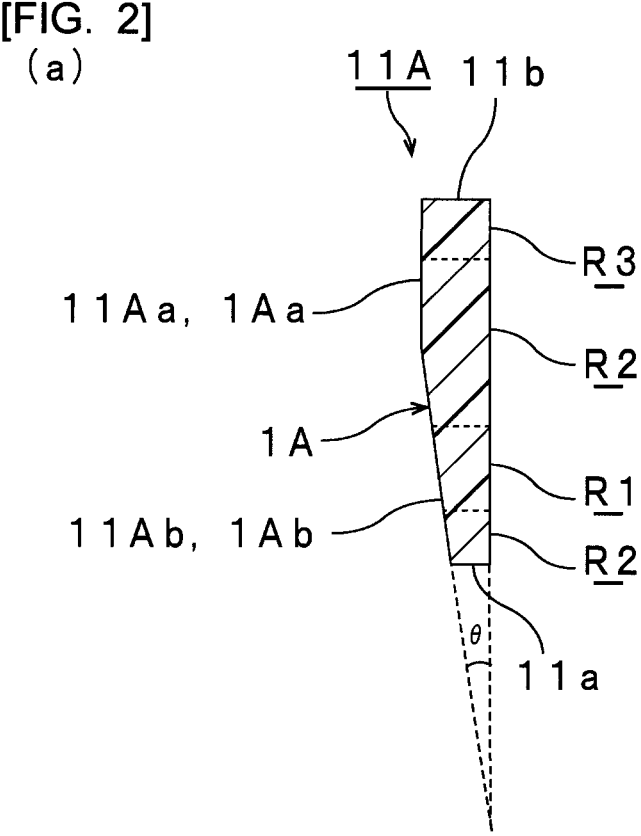
(b)
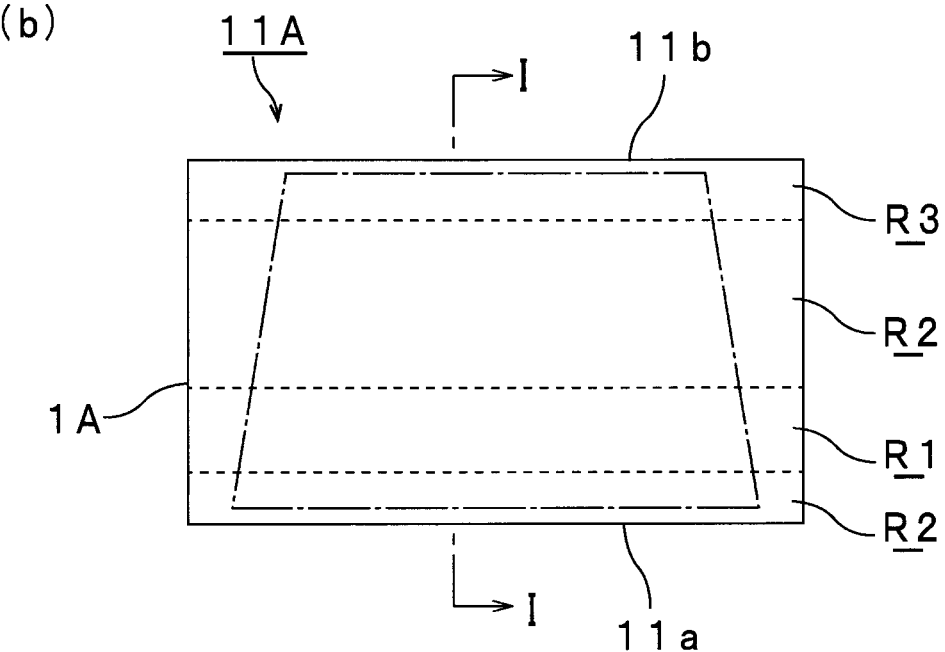

[FIG. 3]
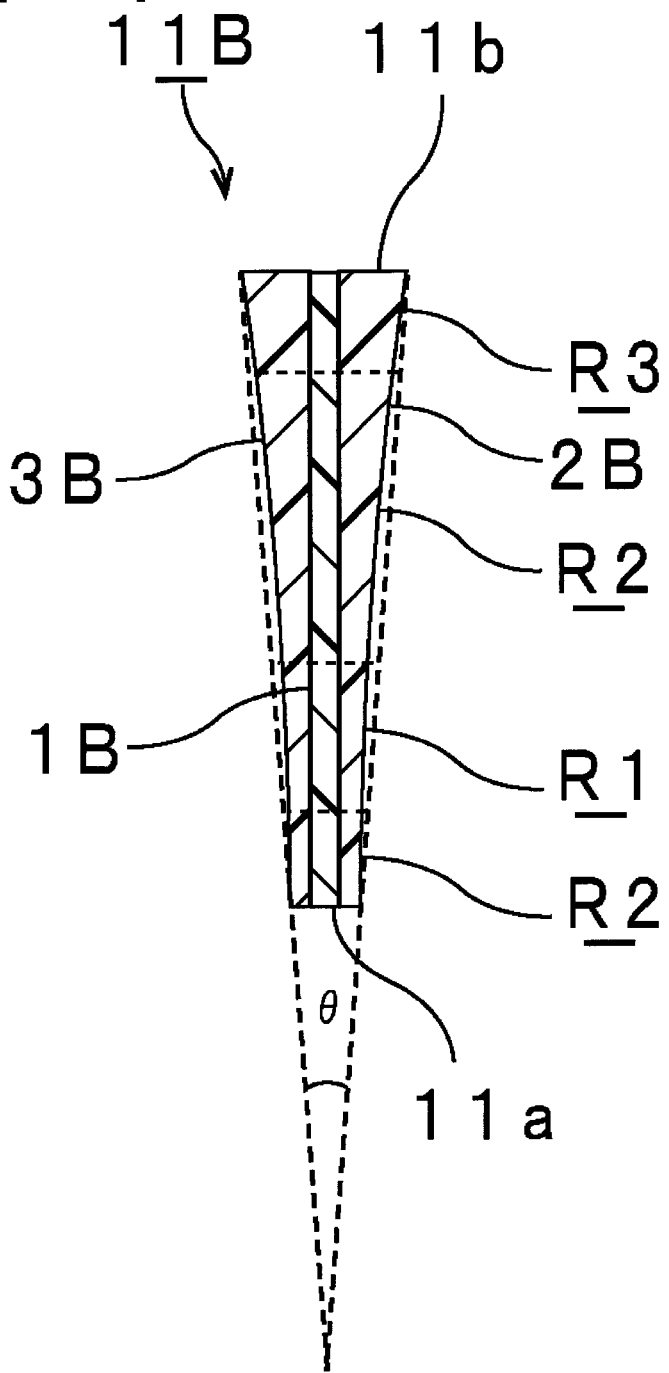

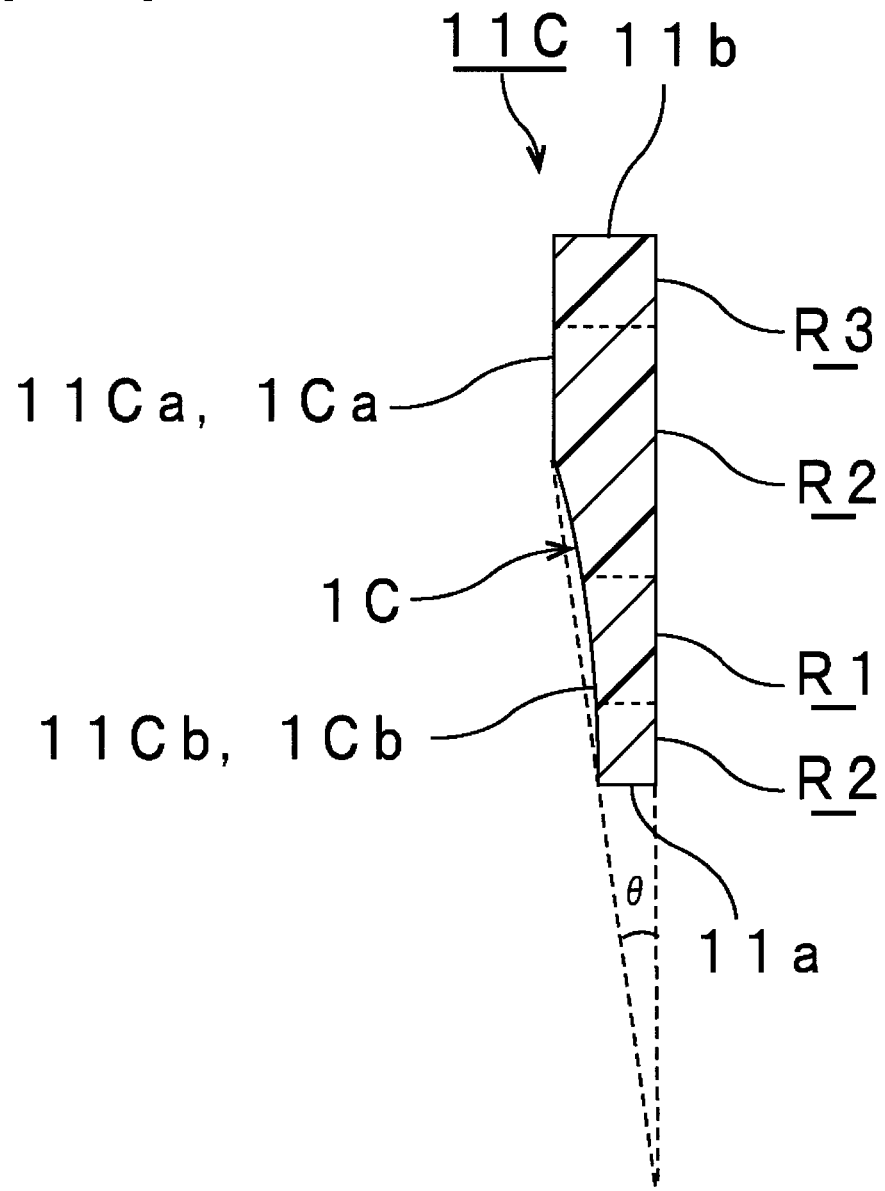
[FIG. 4]

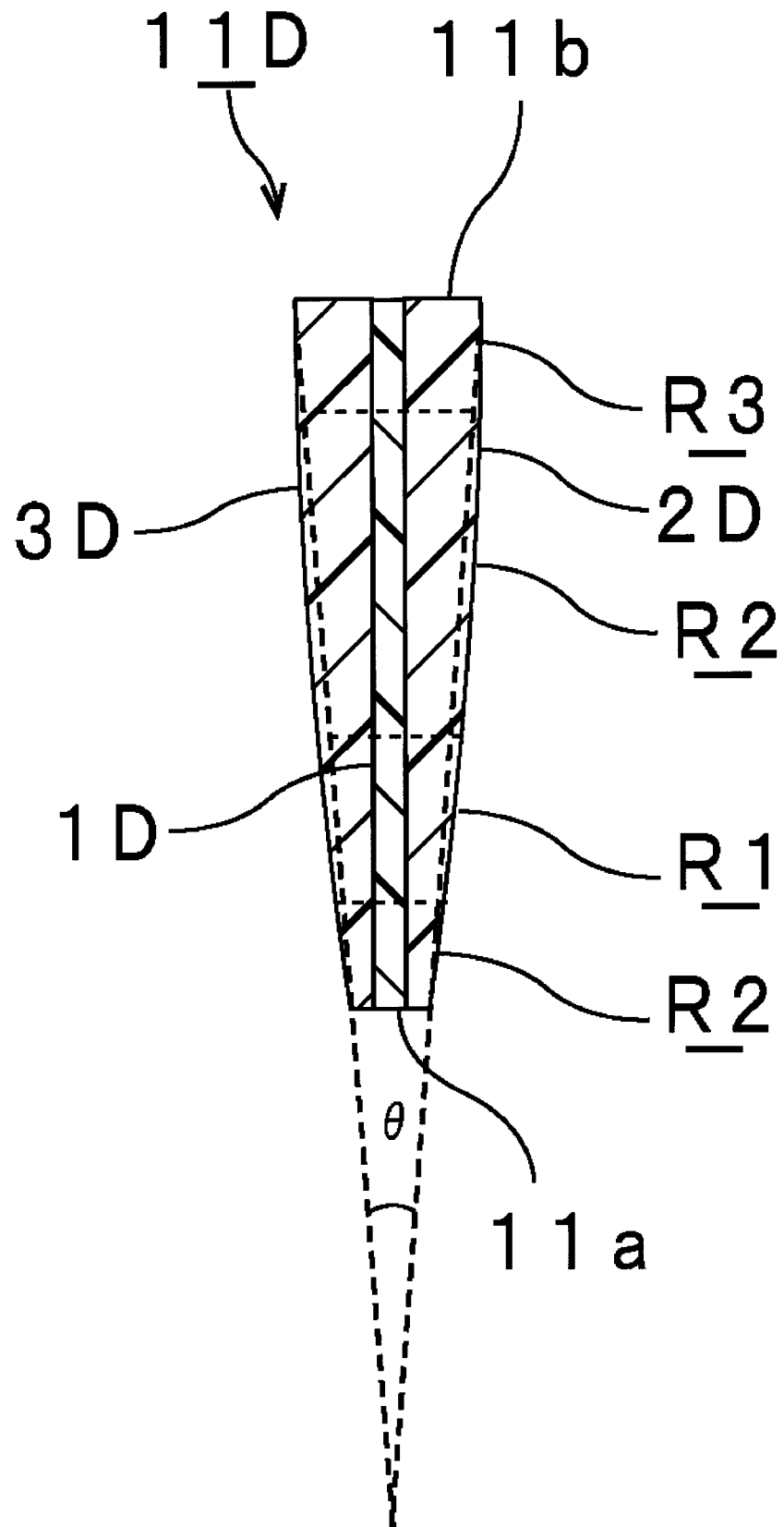

[FIG. 6]
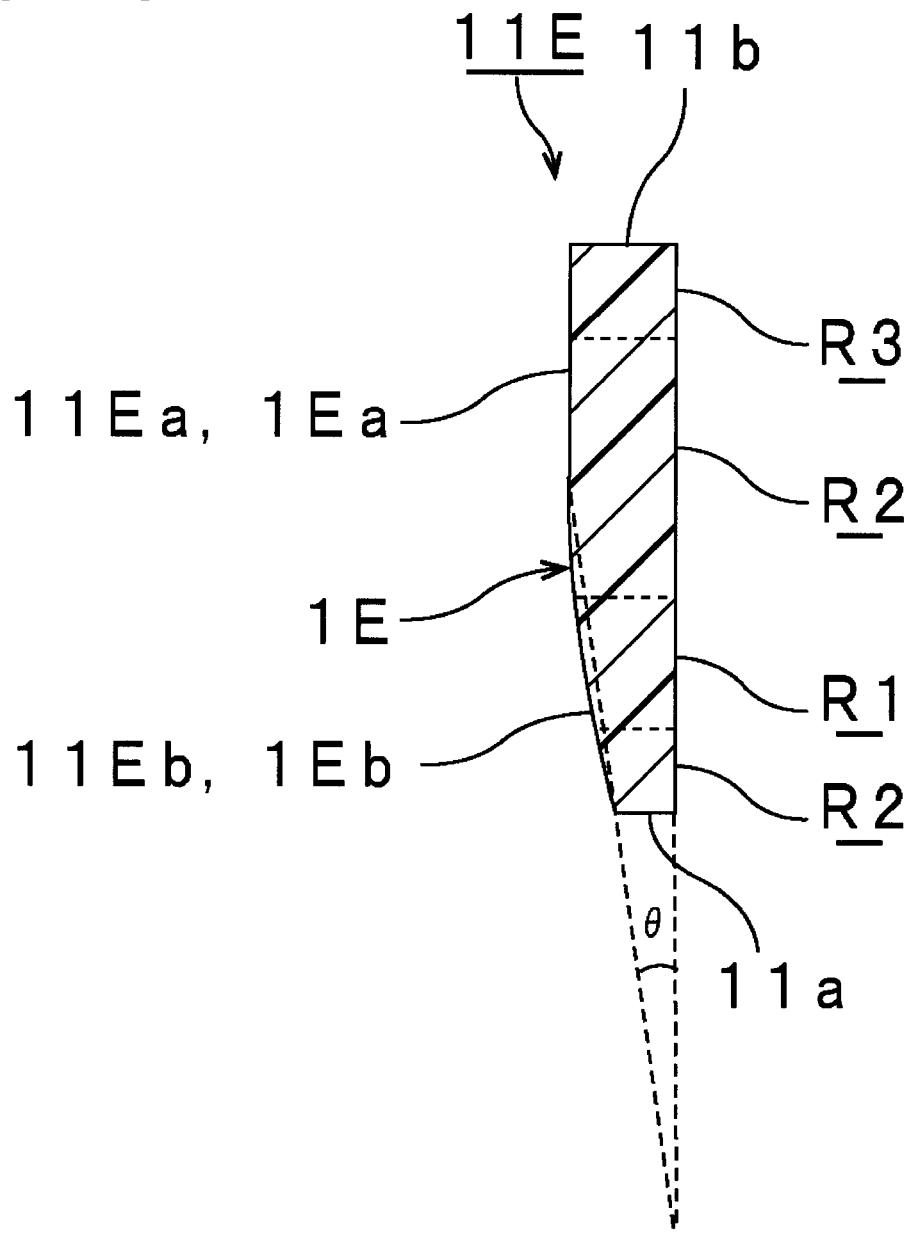

[FIG. 7]
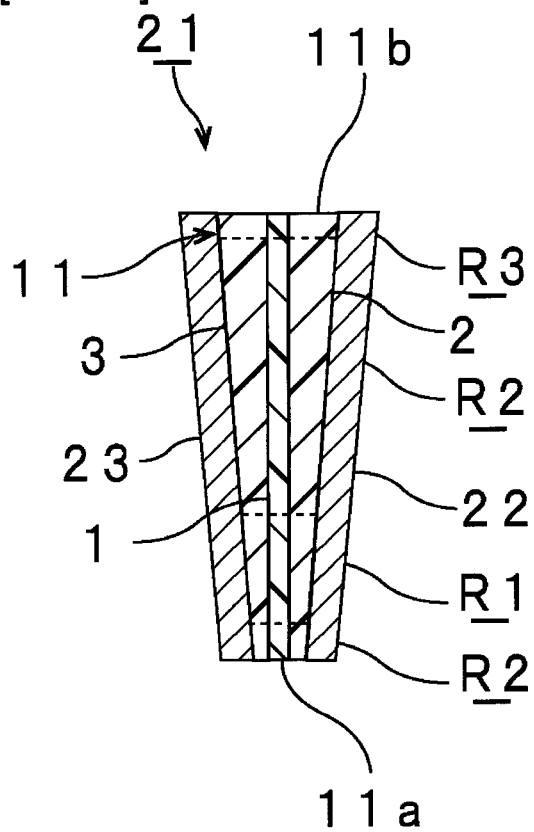
[FIG. 8]
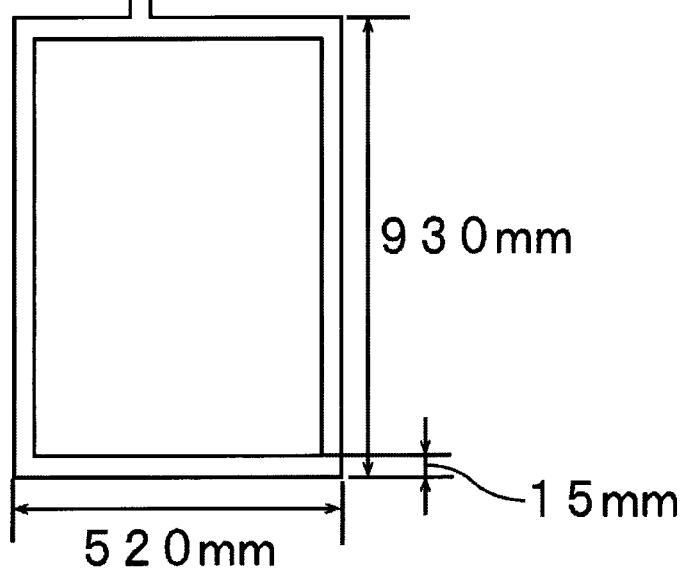

INTERLAYER FILM FOR LAMINATED GLASS, AND LAMINATED GLASS

TECHNICAL FIELD

The present invention relates to an interlayer film for laminated glass which is used for obtaining laminated glass. Moreover, the present invention relates to a laminated glass prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates.

The following Patent Document 1 discloses an interlayer film containing a polyvinyl acetal resin and a moisture resistance improving agent. As the moisture resistance improving agent, amphiphiles and surfactants are recited. Patent Document 1 discloses that the whitening distance is smaller in the laminated glass prepared with the above-mentioned interlayer film.

Moreover, as the laminated glass used for automobiles, a head-up display (HUD) has been known. In a HUD, it is possible to display measured information including automobile traveling data such as speed on the windshield of the automobile, and the driver can recognize as if the display were shown in front of the windshield.

In the HUD, there is a problem that the measured information or the like is doubly observed.

In order to suppress double images, a wedge-like shaped interlayer film has been used. The following Patent Document 2 discloses a laminated glass in which a wedge-like shaped interlayer film having a prescribed wedge angle is sandwiched between a pair of glass plates. In such a sheet of laminated glass, by the adjustment of the wedge angle of the interlayer film, a display of measured information reflected by one glass plate and a display of measured information reflected by another glass plate can be focused into one point to make an image in the visual field of a driver. As such, the display of measured information is hard to be observed doubly and the visibility of a driver is hardly hindered.

RELATED ART DOCUMENT

Patent Document

Patent Document 1: WO 2006/004162 A1
Patent Document 2: JP H4-502525 T

SUMMARY OF THE INVENTION

Problems to be Solved by the Invention

Patent Document 1 discloses that the whitening distance is smaller in the laminated glass prepared with the above-mentioned interlayer film. However, the interlayer film described in Patent Document 1 is an interlayer film having a uniform thickness, and is not a wedge-like shaped interlayer film.

On the other hand, in the wedge-like shaped interlayer film as described in Patent Document 2, the moisture resistance of the laminated glass under high temperature and high humidity can differ between the one end and the other end because the thickness differs between the one end and the other end. As a result, the adhesivity of the laminated glass under high temperature and high humidity can differ between the one end and the other end.

The present invention is aimed at providing an interlayer film for laminated glass capable of suppressing double images in a laminated glass, and capable of making the moisture resistance of the laminated glass exposed to high temperature and high humidity uniform at one end and the other end of the interlayer film although the thickness of the interlayer film in the laminated glass differs between the one end and the other end. Moreover, the present invention is also aimed at providing a laminated glass prepared with the above-mentioned interlayer film for laminated glass.

Means for Solving the Problems

The present inventors found that the moisture resistance of a laminated glass exposed to high temperature and high humidity differs between one end and the other end of an interlayer film when the thickness of the interlayer film differs between the one end and the other end. The present inventors found the configuration capable of making the moisture resistance of a laminated glass exposed to high temperature and high humidity uniform at one end and the other end of an interlayer film although the thickness of the interlayer film differs between the one end and the other end.

According to a broad aspect of the present invention, there is provided an interlayer film for laminated glass (in the present specification, sometimes abbreviated as "interlayer film"), being wedge-like shaped and having one end and the other end being at the opposite side of the one end, the other end having a thickness that is larger than a thickness of the one end, the interlayer film containing a thermoplastic resin, the interlayer film containing an amphiphile or a surfactant, the interlayer film being an interlayer film having a whitening distance at the one end of the interlayer film of 15 mm or less, and a whitening distance at the other end of the interlayer film of 15 mm or less, and showing a value of (whitening distance at the other end of the interlayer film×thickness of the other end of the interlayer film)/(whitening distance at the one end of the interlayer film×thickness of the one end of the interlayer film) of 0.70 or more, when the whitening distance at the one end of the interlayer film is more than 0 mm, when the following high temperature and high humidity test for laminated glass is executed.

High temperature and high humidity test for laminated glass includes: preparing two sheets of green glass having a thickness of 2 mm that are in conformity with JIS R3208; obtaining a laminated glass by sandwiching the interlayer film between the two sheets of green glass; leaving the obtained laminated glass to stand at 80° C. and a relative humidity of 95% for 2 weeks; measuring, in the laminated glass after being left to stand, a distance in which whitening occurs inwardly from the one end of the interlayer film, and determining the distance as a whitening distance at the one end of the interlayer film; and measuring, in the laminated glass after being left to stand, a distance in which whitening occurs inwardly from the other end of the interlayer film, and determining the distance as a whitening distance at the other end of the interlayer film.

In a specific aspect of the interlayer film according to the present invention, an absolute value of difference between the whitening distance at the one end of the interlayer film and the whitening distance at the other end of the interlayer film is 5 mm or less when the high temperature and high humidity test is executed.

In a specific aspect of the interlayer film according to the present invention, the interlayer film has a wedge angle of 0.2 mrad or more.

In a specific aspect of the interlayer film according to the present invention, the interlayer film contains a plasticizer.

In a specific aspect of the interlayer film according to the present invention, the interlayer film contains a heat shielding substance.

In a specific aspect of the interlayer film according to the present invention, the interlayer film includes a first layer and a second layer arranged on a first surface side of the first layer.

In a specific aspect of the interlayer film according to the present invention, the first layer contains a polyvinyl acetal resin, the second layer contains a polyvinyl acetal resin, and the content of the hydroxyl group of the polyvinyl acetal resin in the first layer is lower than the content of the hydroxyl group of the polyvinyl acetal resin in the second layer.

In a specific aspect of the interlayer film according to the present invention, the first layer contains a polyvinyl acetal resin, the second layer contains a polyvinyl acetal resin, the first layer contains a plasticizer, the second layer contains a plasticizer, and the content of the plasticizer in the first layer relative to 100 parts by weight of the polyvinyl acetal resin in the first layer is larger than the content of the plasticizer in the second layer relative to 100 parts by weight of the polyvinyl acetal resin in the second layer.

In a specific aspect of the interlayer film according to the present invention, when the interlayer film has an average thickness T, the first layer has an average thickness of 0.0625 T or more and 0.375 T or less.

In a specific aspect of the interlayer film according to the present invention, the interlayer film is used for a laminated glass that is a head-up display.

According to a broad aspect of the present invention, there is provided a laminated glass including a first lamination glass member, a second lamination glass member and the interlayer film for laminated glass described above, the interlayer film being arranged between the first lamination glass member and the second lamination glass member.

According to a broad aspect of the present invention, there is provided a laminated glass including a first lamination glass member, a second lamination glass member and an interlayer film for laminated glass, the interlayer film being arranged between the first lamination glass member and the second lamination glass member, the interlayer film being an interlayer film for laminated glass, being wedge-like shaped and having one end and the other end being at the opposite side of the one end, the other end having a thickness that is larger than a thickness of the one end, the interlayer film containing a thermoplastic resin, the interlayer film containing an amphiphile or a surfactant, the laminated glass being a laminated glass having a whitening distance at the one end of the interlayer film of 15 mm or less, and a whitening distance at the other end of the interlayer film of 15 mm or less, and showing a value of (whitening distance at the other end of the interlayer film×thickness of the other end of the interlayer film)/(whitening distance at the one end of the interlayer film×thickness of the one end of the interlayer film) of 0.70 or more, when the whitening distance at the one end of the interlayer film is more than 0 mm, when the following high temperature and high humidity test for laminated glass is executed.

High temperature and high humidity test for laminated glass includes: leaving the laminated glass to stand at 80° C. and a relative humidity of 95% for 2 weeks; measuring, in the laminated glass after being left to stand, a distance in which whitening occurs inwardly from the one end of the interlayer film, and determining the distance as a whitening distance at the one end of the interlayer film; and measuring, in the laminated glass after being left to stand, a distance in which whitening occurs inwardly from the other end of the interlayer film, and determining the distance as a whitening distance at the other end of the interlayer film.

Effect of the Invention

The interlayer film for laminated glass according to the present invention is an interlayer film for laminated glass, being wedge-like shaped and having one end and the other end being at the opposite side of the one end, the other end having a thickness that is larger than a thickness of the one end. The interlayer film for laminated glass according to the present invention contains a thermoplastic resin. The interlayer film for laminated glass according to the present invention contains an amphiphile or a surfactant. The interlayer film for laminated glass according to the present invention is an interlayer film having a whitening distance at the one end of the interlayer film of 15 mm or less and a whitening distance at the other end of the interlayer film of 15 mm or less when a high temperature and high humidity test for laminated glass is executed. The interlayer film for laminated glass according to the present invention is an interlayer film showing a value of (whitening distance at the other end of the interlayer film×thickness of the other end of the interlayer film)/(whitening distance at the one end of the interlayer film×thickness of the one end of the interlayer film) of 0.70 or more, when a whitening distance at the one end of the interlayer film is more than 0 mm, when a high temperature and high humidity test for laminated glass is executed.

Since the interlayer film for laminated glass according to the present invention is provided with the above-mentioned configuration, it is possible to suppress double images in a laminated glass, and make the moisture resistance of the laminated glass exposed to high temperature and high humidity uniform at one end and the other end of the interlayer film although the thickness of the interlayer film in the laminated glass differs between the one end and the other end.

The laminated glass according to the present invention is a laminated glass including a first lamination glass member, a second lamination glass member and an interlayer film for laminated glass. In the laminated glass according to the present invention, the above-mentioned interlayer film is arranged between the first lamination glass member and the second lamination glass member. In the laminated glass according to the present invention, the interlayer film is an interlayer film for laminated glass, being wedge-like shaped and having one end and the other end being at the opposite side of the one end, the other end having a thickness that is larger than a thickness of the one end. In the laminated glass according to the present invention, the interlayer film contains a thermoplastic resin. In the laminated glass according to the present invention, the interlayer film contains an amphiphile or a surfactant. The laminated glass according to the present invention is a laminated glass having a whitening distance at the one end of the interlayer film of 15 mm or less and a whitening distance at the other end of the interlayer film of 15 mm or less when a high temperature and high humidity test for laminated glass is executed. The laminated glass according to the present invention is a laminated glass showing a value of (whitening distance at the other end of the interlayer film×thickness of the other end of the interlayer film)/(whitening distance at the one end of the interlayer film×thickness of the one end of the interlayer film) of 0.70 or more, when a whitening distance at the one end of the interlayer film is more than 0 mm, when a high temperature and high humidity test for laminated glass is executed.

Since the laminated glass according to the present invention is provided with the above-mentioned configuration, it is possible to suppress double images in a laminated glass, and make the moisture resistance of the laminated glass exposed to high temperature and high humidity uniform at one end and the other end of the interlayer film although the thickness of the interlayer film in the laminated glass differs between the one end and the other end.

BRIEF DESCRIPTION OF DRAWINGS

FIGS. 1(a) and (b) are a sectional view and a front view, respectively, schematically showing an interlayer film for laminated glass, in accordance with a first embodiment of the present invention.

FIGS. 2(a) and (b) are a sectional view and a front view, respectively, schematically showing an interlayer film for laminated glass, in accordance with a second embodiment of the present invention.

FIG. 3 is a sectional view schematically showing an interlayer film for laminated glass in accordance with a third embodiment of the present invention.

FIG. 4 is a sectional view schematically showing an interlayer film for laminated glass in accordance with a fourth embodiment of the present invention.

FIG. 5 is a sectional view schematically showing an interlayer film for laminated glass in accordance with a fifth embodiment of the present invention.

FIG. 6 is a sectional view schematically showing an interlayer film for laminated glass in accordance with a sixth embodiment of the present invention.

FIG. 7 is a sectional view showing an example of a laminated glass prepared with the interlayer film for laminated glass shown in FIG. 1.

FIG. 8 is a figure for explaining a preliminary pressing-bonding method used in evaluation of double images in Examples.

MODE(S) FOR CARRYING OUT THE INVENTION

Hereinafter, the details of the present invention will be described.

The interlayer film for laminated glass (in the present specification, sometimes abbreviated as "interlayer film") according to the present invention is used for laminated glass.

The interlayer film according to the present invention has one end and the other end being at the opposite side of the one end. The one end and the other end are end portions of both sides facing each other in the interlayer film. In the interlayer film according to the present invention, the thickness of the other end is larger than the thickness of the one end. The interlayer film according to the present invention is a wedge-like shaped interlayer film for laminated glass.

The interlayer film according to the present invention contains a thermoplastic resin. The interlayer film according to the present invention contains an amphiphile or a surfactant.

The interlayer film according to the present invention is an interlayer film having a whitening distance at the one end of the interlayer film of 15 mm or less and a whitening distance at the other end of the interlayer film of 15 mm or less when the following high temperature and high humidity test for laminated glass is executed. The interlayer film according to the present invention is an interlayer film showing a value of (whitening distance at the other end of the interlayer film×thickness of the other end of the interlayer film)/(whitening distance at the one end of the interlayer film×thickness of the one end of the interlayer film) of 0.70 or more, when a whitening distance at the one end of the interlayer film is more than 0 mm, when the following high temperature and high humidity test for laminated glass is executed.

High temperature and high humidity test for laminated glass directed to the interlayer film according to the present invention: Two sheets of green glass having a thickness of 2 mm that are in conformity with JIS R3208 are prepared. By sandwiching the interlayer film between the two sheets of green glass, a laminated glass is obtained. The obtained laminated glass is left to stand at 80° C. and a relative humidity of 95% for 2 weeks. In the laminated glass after being left to stand, a distance in which whitening occurs inwardly from the one end of the interlayer film is measured, and the distance is determined as a whitening distance at the one end of the interlayer film. In the laminated glass after being left to stand, a distance in which whitening occurs inwardly from the other end of the interlayer film is measured, and the distance is determined as a whitening distance at the other end of the interlayer film.

Since the interlayer film according to the present invention is provided with the above-mentioned configuration, it is possible to suppress double images in a laminated glass, and make the moisture resistance of the laminated glass exposed to high temperature and high humidity uniform at one end and the other end of the interlayer film although the thickness of the interlayer film in the laminated glass differs between the one end and the other end.

Moreover, since the interlayer film according to the present invention is provided with the above-mentioned configuration, it is possible to make the adhesivity of the laminated glass exposed to high temperature and high humidity uniform at one end and the other end of the interlayer film although the thickness of the interlayer film in the laminated glass differs between the one end and the other end.

In the high temperature and high humidity test for laminated glass directed to the interlayer film according to the present invention, two sheets of the green glass are used for the test. The interlayer film according to the present invention may be used while it is arranged between two lamination glass members other than green glass.

Also, the laminated glass according to the present invention is a laminated glass including a first lamination glass member, a second lamination glass member and an interlayer film for laminated glass. In the laminated glass according to the present invention, the above-mentioned interlayer film is arranged between the first lamination glass member and the second lamination glass member.

In the laminated glass according to the present invention, the interlayer film is an interlayer film for laminated glass, being wedge-like shaped and having one end and the other end being at the opposite side of the one end, the other end having a thickness that is larger than a thickness of the one end. In the laminated glass according to the present invention, the interlayer film contains a thermoplastic resin. In the laminated glass according to the present invention, the interlayer film contains an amphiphile or a surfactant.

The laminated glass according to the present invention is a laminated glass having a whitening distance at the one end of the interlayer film of 15 mm or less and a whitening distance at the other end of the interlayer film of 15 mm or less when a high temperature and high humidity test for laminated glass is executed. The laminated glass according to the present invention is a laminated glass showing a value of (whitening distance at the other end of the interlayer film×thickness of the other end of the interlayer film)/(whitening distance at the one end of the interlayer film×thickness of the one end of the interlayer film) of 0.70 or more, when a whitening distance at the one end of the interlayer film is more than 0 mm, when a high temperature and high humidity test for laminated glass is executed.

High temperature and high humidity test for laminated glass directed to the laminated glass according to the present invention: a laminated glass is left to stand at 80° C. and a relative humidity of 95% for 2 weeks. In the laminated glass after being left to stand, a distance in which whitening occurs inwardly from the one end of the interlayer film is measured, and the distance is determined as a whitening distance at the one end of the interlayer film. In the laminated glass after being left to stand, a distance in which whitening occurs inwardly from the other end of the interlayer film is measured, and the distance is determined as a whitening distance at the other end of the interlayer film.

Since the laminated glass according to the present invention is provided with the above-mentioned configuration, it is possible to suppress double images in a laminated glass, and make the moisture resistance of the laminated glass exposed to high temperature and high humidity uniform at one end and the other end of the interlayer film although the thickness of the interlayer film in the laminated glass differs between the one end and the other end.

Moreover, since the laminated glass according to the present invention is provided with the above-mentioned configuration, it is possible to make the adhesivity of the laminated glass exposed to high temperature and high humidity uniform at one end and the other end of the interlayer film although the thickness of the interlayer film in the laminated glass differs between the one end and the other end.

In the high temperature and high humidity test for laminated glass directed to the laminated glass according to the present invention, the laminated glass according to the present invention itself is used.

In the high temperature and high humidity test for laminated glass directed to the interlayer film according to the present invention, and the high temperature and high humidity test for laminated glass directed to the laminated glass according to the present invention, a whitening distance specifically means the following distance. A whitening distance at the one end of the interlayer film means a distance of the shortest line connecting the one end and the farthest position from the one end in the part where whitening occurs on the one end side. A whitening distance at the other end of the interlayer film means a distance of the shortest line connecting the other end and the farthest position from the other end in the part where whitening occurs on the other end side.

When the whitening distance at the one end of the interlayer film is more than 0 mm, whitening occurs at the one end of the interlayer film.

From the viewpoint of further enhancing the moisture resistance, the whitening distance at the one end of the interlayer film is preferably 12.5 mm or less, more preferably 12.0 mm or less when a high temperature and high humidity test for laminated glass is executed in the interlayer film according to the present invention and in the laminated glass according to the present invention. The whitening distance at the one end of the interlayer film may be more than 0 mm, and is preferably 0 mm.

From the viewpoint of further enhancing the moisture resistance, the whitening distance at the other end of the interlayer film is preferably 12.5 mm or less, more preferably 12.0 mm or less when a high temperature and high humidity test for laminated glass is executed in the interlayer film according to the present invention and in the laminated glass according to the present invention. The whitening distance at the other end of the interlayer film may be more than 0 mm, and is preferably 0 mm.

When the whitening distance is 0 mm, whitening does not occur.

When a whitening distance at the one end of the interlayer film is more than 0 mm, a value of (whitening distance at the other end of the interlayer film×thickness of the other end of the interlayer film)/(whitening distance at the one end of the interlayer film×thickness of the one end of the interlayer film) is defined as a value A. From the viewpoint of further enhancing the moisture resistance, the value A when a high temperature and high humidity test for laminated glass is executed in the interlayer film according to the present invention and in the laminated glass according to the present invention is 0.70 or more, preferably 0.75 or more. The value A when a high temperature and high humidity test for laminated glass is executed in the interlayer film according to the present invention and in the laminated glass according to the present invention may be 1.6 or less, or may be 1.5 or less.

It is often the case that the value A is not 0.70 or more only by containing an amphiphile or a surfactant in the interlayer film. In order to control the value A to 0.70 or more or within the above-mentioned preferred range, it is necessary to adjust the content or the kind of the amphiphile or the surfactant, or to give distribution in the content of the amphiphile or the surfactant in the interlayer film by dipping one end side of the interlayer film in the amphiphile or the surfactant, or by applying the amphiphile or the surfactant on the one end side of the interlayer film.

An absolute value of difference between a whitening distance at the one end of the interlayer film and a whitening distance at the other end of the interlayer film is referred to as an absolute value B. From the viewpoint of further enhancing the moisture resistance, the absolute value B when a high temperature and high humidity test for laminated glass is executed in the interlayer film according to the present invention and in the laminated glass according to the present invention is 5 mm or less, more preferably 4 mm or less. In the interlayer film according to the present invention and in the laminated glass according to the present invention, when the high temperature and high humidity test for laminated glass is executed, the absolute value B of difference between the whitening distance at the one end of the interlayer film and the whitening distance at the other end of the interlayer film may be 0 mm, or may be more than 0 mm.

It is often the case that the absolute value B fails to satisfy the above-mentioned preferred range only by containing an amphiphile or a surfactant in the interlayer film. In order to control the absolute value B within the above-mentioned preferred range, it is necessary to adjust the content or the kind of the amphiphile or the surfactant, or to give distribution in the content of the amphiphile or the surfactant in the interlayer film by dipping one end side of the interlayer film in the amphiphile or the surfactant, or by applying the amphiphile or the surfactant on the one end side of the interlayer film.

The interlayer film according to the present invention is suitably used for laminated glass serving as a head-up display (HUD). It is preferred that the interlayer film according to the present invention be an interlayer film for HUD. It is preferred that the interlayer film according to the present invention have, for example, a region for display corresponding to a display region of a head-up display. The region for display is a region capable of favorably displaying information.

From the viewpoint of suppressing the double images more effectively, it is preferred that the interlayer film according to the present invention have the region for display in a region extending from a position of 6 cm from the one end (thinner side) toward the other end to a position of 63.8 cm from the one end toward the other end. The region for display may exist in a part or the whole of the region from a position of 6 cm from the one end toward the other end to a position of 63.8 cm from the one end toward the other end.

The wedge-like shaped interlayer film has a portion with a sectional shape in the thickness direction of a wedge-like shape. It is preferred that the sectional shape in the thickness direction of the region for display be wedge-like shaped.

From the viewpoint of suppressing the double images effectively, it is preferred that the interlayer film have a portion with a sectional shape in the thickness direction of a wedge-like shape in the region between a position of 6 cm toward the other end from the one end and a position of 63.8 cm toward the other end from the one end. The portion with a sectional shape in the thickness direction of a wedge-like shape may exist in a part or the whole of the region to the position of 63.8 cm from the one end toward the other end.

The interlayer film according to the present invention may have a shading region. The shading region may be separate from the region for display. The shading region is provided so as to prevent a driver from feeling glare while driving, for example, by sunlight or outdoor lighting. The shading region can be provided so as to impart the heat blocking property. It is preferred that the shading region be located in an edge portion of the interlayer film. It is preferred that the shading region be belt-shaped.

In the shading region, a coloring agent or a filler may be used so as to change the color and the visible light transmittance. The coloring agent or the filler may be contained in a partial region in the thickness direction of the interlayer film or may be contained in the entire region in the thickness direction of the interlayer film.

From the viewpoint of providing better display, and further broadening the field of view, the visible light transmittance of the region for display is preferably 80% or more, more preferably 88% or more, further preferably 90% or more. It is preferred that the visible light transmittance of the region for display be higher than the visible light transmittance of the shading region. The visible light transmittance of the region for display may be lower than the visible light transmittance of the shading region. The visible light transmittance of the region for display is higher than the visible light transmittance of the shading region preferably by 50% or more, more preferably by 60% or more.

When the visible light transmittance varies in the interlayer film of each of the region for display and the shading region, the visible light transmittance is measured at the center position of the region for display and at the center position of the shading region.

The visible light transmittance at a wavelength ranging from 380 to 780 nm of the obtained laminated glass can be measured by using a spectrophotometer ("U-4100" available from Hitachi High-Tech Science Corporation) in conformity with JIS R3211:1998. As the glass plate, it is preferred to use clear glass having a thickness of 2 mm.

It is preferred that the region for display have a length direction and a width direction. For excellent versatility of the interlayer film, it is preferred that the width direction of the region for display be the direction connecting the one end and the other end. It is preferred that the region for display be belt-shaped.

It is preferred that the interlayer film has an MD direction and a TD direction. For example, the interlayer film is obtained by melt extrusion molding. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film. It is preferred that the one end and the other end be located on either side of the TD direction.

The interlayer film may be wound into a roll shape to form a roll body of the interlayer film. The roll body may be provided with a winding core and the interlayer film. The interlayer film may be wound around an outer periphery of the winding core.

The interlayer film has a one-layer structure or a two or more-layer structure. The interlayer film may have a one-layer structure and may have a two or more-layer structure. The interlayer film may have a two-layer structure, may have a three-layer structure, and may have a three or more-layer structure. The interlayer film may be a single-layered interlayer film and may be a multi-layered interlayer film.

Hereinafter, specific embodiments of the present invention will be described with reference to the drawings.

FIGS. 1(a) and (b) are a sectional view and a front view, respectively, schematically showing an interlayer film for laminated glass in accordance with a first embodiment of the present invention. FIG. 1(a) is a sectional view along the line I-I in FIG. 1(b). The size and dimension of the interlayer film in FIG. 1 and later described drawings are appropriately changed from the actual size and shape for convenience of illustration.

In FIG. 1(a), a section in the thickness direction of an interlayer film 11 is shown. In this connection, in FIG. 1(a) and later described drawings, for convenience of illustration, the thicknesses of an interlayer film and respective layers constituting the interlayer film and the wedge angle (A) are shown so as to be different from actual thicknesses thereof and an actual wedge angle.

The interlayer film 11 includes a first layer 1 (intermediate layer), a second layer 2 (surface layer), and a third layer 3 (surface layer). The second layer 2 is arranged on a first surface side of the first layer 1 to be layered thereon. The third layer 3 is arranged on a second surface side opposite to the first surface of the first layer 1 to be layered thereon. The first layer 1 is arranged between the second layer 2 and the third layer 3 to be sandwiched therebetween. The interlayer film 11 is used for obtaining laminated glass. The interlayer film 11 is an interlayer film for laminated glass. The interlayer film 11 is a multilayer interlayer film.

The interlayer film 11 has one end 11a and the other end 11b at the opposite side of the one end 11a. The one end 11a and the other end 11b are end parts of both sides facing each other. The sectional shape in the thickness direction of each of the second layer 2 and the third layer 3 is wedge-like shaped. The sectional shape in the thickness direction of the first layer 1 is a rectangular shape. The thicknesses of the second layer 2 and the third layer 3 are larger in the other end 11b side than in the one end 11a side. Accordingly, the thickness of the other end 11b of the interlayer film 11 is larger than the thickness of the one end 11a thereof. Accordingly, the interlayer film 11 has a region being thin in thickness and a region being thick in thickness.

The interlayer film 11 has a region where the thickness increases from the one end 11a side to the other end 11b side. In the interlayer film 11, the increment of the thickness is uniform from the one end 11a side to the other end 11b side in the region where the thickness increases.

The interlayer film 11 has a region for display R1 corresponding to a display region of a head-up display. The interlayer film 11 has a surrounding region R2 neighboring the region for display R1. In the present embodiment, the region for display R1 is a region between a position of 6 cm toward the other end 11b from the one end 11a and a position of 63.8 cm toward the other end 11b from the one end 11a.

The interlayer film 11 has a shading region R3 that is separate from the region for display R1. The shading region R3 is located in an edge portion of the interlayer film 11.

The interlayer film has a shape as shown in FIG. 1(a), and may have a one-layer structure, a two-layer structure or four or more-layer structure.

FIGS. 2(a) and (b) are a sectional view and a front view, respectively, schematically showing an interlayer film for laminated glass in accordance with a second embodiment of the present invention. FIG. 2(a) is a sectional view along the line I-I in FIG. 2(b). In FIG. 2(a), a section in the thickness direction of an interlayer film 11A is shown.

The interlayer film 11A shown in FIG. 2 includes a first layer 1A. The interlayer film 11A has a one-layer structure composed only of the first layer 1A and is a single-layered interlayer film. The interlayer film 11A is singly constituted by the first layer 1A. The interlayer film 11A is used for obtaining laminated glass. The interlayer film 11A is an interlayer film for laminated glass.

The interlayer film 11A has one end 11a and the other end 11b at the opposite side of the one end 11a. The one end 11a and the other end 11b are end parts of both sides facing each other. The thickness of the other end 11b of the interlayer film 11A is larger than the thickness of the one end 11a thereof. Accordingly, the first layer 1A corresponding to the interlayer film 11A has a region being thin in thickness and a region being thick in thickness.

The interlayer film 11A has a region where the thickness increases from the one end 11a side to the other end 11b side. In the interlayer film 11A, the increment of the thickness is uniform from the one end 11a side to the other end 11b side in the region where the thickness increases.

The interlayer film 11A and the first layer 1A have portions 11Aa, 1Aa having a rectangular sectional shape in the thickness direction, and portions 11Ab, 1Ab having a wedge-like sectional shape in the thickness direction.

The interlayer film 11A has a region for display R1 corresponding to a display region of a head-up display. The interlayer film 11A has a surrounding region R2 neighboring the region for display R1.

The interlayer film 11A has a shading region R3 that is separate from the region for display R1. The shading region R3 is located in an edge portion of the interlayer film 11A.

The interlayer film has a shape as shown in FIG. 2(a) and may have a two or more layer structure.

FIG. 3 is a sectional view schematically showing an interlayer film for laminated glass in accordance with a third embodiment of the present invention. In FIG. 3, a section in the thickness direction of an interlayer film 11B is shown.

The interlayer film 11B shown in FIG. 3 includes a first layer 1B (intermediate layer), a second layer 2B (surface layer), and a third layer 3B (surface layer). The interlayer film 11 and the interlayer film 11B are different from each other in the increment of the thickness in the region where the thickness increases.

The interlayer film 11B has a region where the thickness increases from one end 11a side to the other end 11b side. The interlayer film 11B has a part where the increment of the thickness increases from the one end 11a side to the other end 11b side in the region where the thickness increases. The interlayer film 11B has a region with a sectional shape in the thickness direction of a wedge-like shape. The interlayer film 11B has a part where the wedge angle increases from the one end side to the other end side in the region with a sectional shape in the thickness direction of a wedge-like shape.

FIG. 4 is a sectional view schematically showing an interlayer film for laminated glass in accordance with a fourth embodiment of the present invention. In FIG. 4, a section in the thickness direction of an interlayer film 11C is shown.

The interlayer film 11C shown in FIG. 4 includes a first layer 1C. The interlayer film 11C has a one-layer structure composed only of the first layer 1C and is a single-layered interlayer film. The interlayer film 11A and the interlayer film 11C are different from each other in the increment of the thickness in the region where the thickness increases.

The interlayer film 11C has a region where the thickness increases from one end 11a side to the other end 11b side. The interlayer film 11C has a part where the increment of the thickness increases from the one end 11a side to the other end 11b side in the region where the thickness increases. The interlayer film 11C has a region with a sectional shape in the thickness direction of a wedge-like shape. The interlayer film 11C has a part where the wedge angle increases from the one end side to the other end side in the region with a sectional shape in the thickness direction of a wedge-like shape.

The interlayer film 11C and the first layer 1C have portions 11Ca, 1Ca having a rectangular sectional shape in the thickness direction, and portions 11Cb, 1Cb having a wedge-like sectional shape in the thickness direction.

FIG. 5 is a sectional view schematically showing an interlayer film for laminated glass in accordance with a fifth embodiment of the present invention. In FIG. 5, a section in the thickness direction of an interlayer film 11D is shown.

The interlayer film 11D shown in FIG. 5 includes a first layer 1D (intermediate layer), a second layer 2D (surface layer), and a third layer 3D (surface layer). The interlayer film 11 and the interlayer film 11D are different from each other in the increment of the thickness in the region where the thickness increases.

The interlayer film 11D has a region where the thickness increases from one end 11a side to the other end 11b side. The interlayer film 11D has a part where the increment of the thickness decreases from the one end 11a side to the other end 11b side in the region where the thickness increases. The interlayer film 11D has a region with a sectional shape in the thickness direction of a wedge-like shape. The interlayer film 11D has a part where the wedge angle decreases from the one end side to the other end side in the region with a sectional shape in the thickness direction of a wedge-like shape.

FIG. 6 is a sectional view schematically showing an interlayer film for laminated glass in accordance with a sixth embodiment of the present invention. In FIG. 6, a section in the thickness direction of an interlayer film 11E is shown.

The interlayer film 11E shown in FIG. 6 includes a first layer 1E. The interlayer film 11E has a one-layer structure composed only of the first layer 1E and is a single-layered interlayer film. The interlayer film 11A and the interlayer film 11E are different from each other in the increment of the thickness in the region where the thickness increases.

The interlayer film 11E has a region where the thickness increases from one end 11a side to the other end 11b side. The interlayer film 11E has a part where the increment of the thickness decreases from the one end 11a side to the other end lib side in the region where the thickness increases. The interlayer film 11E has a region with a sectional shape in the thickness direction of a wedge-like shape. The interlayer film 11E has a part where the wedge angle decreases from the one end side to the other end side in the region with a sectional shape in the thickness direction of a wedge-like shape.

The interlayer film 11E and the first layer 1E have portions 11Ea, 1Ea having a rectangular sectional shape in the thickness direction, and portions 11Eb, 1Eb having a wedge-like sectional shape in the thickness direction.

It is preferred that the interlayer film have a portion with a sectional shape in the thickness direction of a wedge-like shape. It is preferred that the interlayer film have a portion where the thickness gradually increases from one end toward the other end. It is preferred that the sectional shape in the thickness direction of the interlayer film be wedge-like shaped. Examples of the sectional shape in the thickness direction of the interlayer film include a trapezoidal shape, a triangular shape, a pentagonal shape, and the like.

From the viewpoint of further suppressing double images, it is preferred that the interlayer film have a part where the increment of the thickness increases from the one end side to the other end side in the region where the thickness increases. From the viewpoint of further suppressing double images, it is preferred that the interlayer film have a part where the wedge angle increases from the one end side to the other end side in the region where the sectional shape in the thickness direction is wedge-like shaped.

In order to suppress double images, the wedge angle (θ) of the interlayer film can be appropriately set according to the fitting angle of laminated glass. The wedge angle (θ) is a wedge angle in the entire interlayer film. From the viewpoint of further suppressing double images, the wedge angle (θ) of the interlayer film is preferably 0.10 mrad (0.00575 degrees) or more, more preferably 0.20 mrad (0.0115 degrees) or more, and is preferably 2.0 mrad (0.1146 degrees) or less, more preferably 0.7 mrad (0.0401 degrees) or less. The wedge angle (θ) of the interlayer film is an interior angle formed at the intersection point between a straight line connecting surface parts on the one side of the interlayer film (first surface part) of the maximum thickness part and the minimum thickness part in the interlayer film, and a straight line connecting surface parts of the other side of the interlayer film (second surface part) of the maximum thickness part and the minimum thickness part in the interlayer film.

When there are a plurality of maximum thicknesses parts, there are a plurality of minimum thicknesses parts, the maximum thickness part is located in a certain region, or the minimum thickness part is located in a certain region, the maximum thickness part and the minimum thickness part for determining the wedge angle (θ) are selected so that the wedge angle (θ) to be determined is the maximum.

The wedge angle (θ) can be approximately calculated in the following manner. Thickness of the interlayer film is measured at each of the maximum thickness part and the minimum thickness part. On the basis of the result of (an absolute value of difference between the thickness in the maximum thickness part and the thickness in the minimum thickness part (μm)÷a distance between the maximum thickness part and the minimum thickness part (mm)), a wedge angle (θ) is approximately calculated.

When the wedge angle of a general interlayer film is the above-mentioned lower limit or more, the moisture resistance of the laminated glass exposed to high temperature and high humidity tends to differ between the one end and the other end of the interlayer film. In contrast to this, since the present invention employs a specific interlayer film as described above, it is possible to make the moisture resistance and the adhesivity of the laminated glass exposed to high temperature and high humidity uniform at one end and the other end of the interlayer film. When the wedge angle (θ) of the interlayer film is 0.1 mrad or more, the effect of the present invention is effectively exerted, whereas when the wedge angle (θ) of the interlayer film is 0.2 mrad or more, the effect of the present invention is remarkably exerted.

The thickness of the interlayer film is not particularly limited. The thickness of the interlayer film refers to the total thickness of the respective layers constituting the interlayer film. Thus, in the case of the multi-layered interlayer film 11, the thickness of the interlayer film refers to the total thickness of the first layer 1, the second layer 2, and the third layer 3.

The maximum thickness of the interlayer film is preferably 0.1 mm or more, more preferably 0.25 mm or more, further preferably 0.5 mm or more, especially preferably 0.8 mm or more and is preferably 3 mm or less, more preferably 2 mm or less, further preferably 1.5 mm or less.

A distance between the one end and the other end is defined as X. It is preferred that the interlayer film have a minimum thickness in the region at a distance of 0X to 0.2X inwardly from the one end, and a maximum thickness in the region at a distance of 0X to 0.2X inwardly from the other end. It is more preferred that the interlayer film have a minimum thickness in the region at a distance of 0X to 0.1X inwardly from the one end, and a maximum thickness in the region at a distance of 0X to 0.1X inwardly from the other end. It is preferred that the interlayer film have a minimum thickness at the one end and the interlayer film have a maximum thickness at the other end.

The interlayer films 11, 11A, 11B, 11C, 11D, 11E have a maximum thickness in the other end 11b and a minimum thickness in the one end 11a.

From the viewpoint of the practical aspect and the viewpoint of sufficiently heightening the adhesive force and the penetration resistance, the maximum thickness of a surface layer is preferably 0.001 mm or more, more preferably 0.2 mm or more, further preferably 0.3 mm or more, and preferably 1 mm or less, and more preferably 0.8 mm or less.

From the viewpoint of the practical aspect and the viewpoint of sufficiently enhancing the penetration resistance, the maximum thickness of a layer (intermediate layer) arranged between two surface layers is preferably 0.001 mm or more, more preferably 0.1 mm or more, and further preferably 0.2 mm or more and is preferably 0.8 mm or less, more preferably 0.6 mm or less, and further preferably 0.3 mm or less.

As a measuring device for use for measurement of a wedge angle ($\theta$) of the interlayer film, and a thickness of the interlayer film, a contact type thickness measuring instrument "TOF-4R" (available from Yamabun Electronics Co., Ltd.) or the like can be recited.

Measurement of the thickness is conducted so that the distance is the shortest from the one end toward the other end by using the above-described measuring device at a film conveyance speed of 2.15 to 2.25 mm/minutes.

As a measuring device for use for measurement of a wedge angle ($\theta$) of the interlayer film, and a thickness of the interlayer film after the interlayer film is made into laminated glass, a non-contact type multilayer film thickness measuring instrument "OPTIGAUGE" (available from Lumetrics, Inc.) or the like can be recited. The thickness of the interlayer film can be measured while the interlayer film is in the laminated glass.

Hereinafter, the details of materials constituting the respective layers of a multi-layered interlayer film and the single-layered interlayer film will be described.

(Thermoplastic Resin)

It is preferred that the interlayer film contain a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). The thermoplastic resin (1), the thermoplastic resin (2), and the thermoplastic resin (3) may be the same or different from one another. For still higher sound insulating properties, it is preferred that the thermoplastic resin (1) be different from the thermoplastic resin (2) and the thermoplastic resin (3). Each of the polyvinyl acetal resin (1), the polyvinyl acetal resin (2) and the polyvinyl acetal resin (3) may be the same or different from one another. For still higher sound insulating properties, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of a layer containing the polyvinyl acetal resin and the plasticizer to a lamination glass member or another layer is further enhanced.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is preferably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

The content of the hydroxyl group (the amount of hydroxyl groups) of the polyvinyl acetal resin (0) is preferably 15% by mole or more and more preferably 18% by mole or more and is preferably 40% by mole or less and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

A content of the hydroxyl group (the amount of hydroxyl groups) of the polyvinyl acetal resin (1) is preferably 17% by mole or more, more preferably 20% by mole or more, further preferably 22% by mole or more and is preferably 28% by mole or less, more preferably 27% by mole or less, further preferably 25% by mole or less, especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above upper limit or less, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, more preferably 30% by mole or more, still more preferably 31.5% by mole or more, further preferably 32% by mole or more, especially preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further heightening the sound insulating properties, it is preferred that the content of the hydroxyl group of the polyvinyl acetal resin (1) be lower than the content of the hydroxyl group of the polyvinyl acetal resin (2). From the viewpoint of further enhancing the sound insulating properties, it is preferred that the content of the hydroxyl group of the polyvinyl acetal resin (1) be lower than the content of the hydroxyl group of the polyvinyl acetal resin (3). From the viewpoint of still further enhancing the sound insulating properties, the absolute value of a difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more. From the viewpoint of still further enhancing the sound insulating properties, the absolute value of a difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, most preferably 12% by mole or more. The absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) are preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more, and more preferably 0.5% by mole or more and is preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, the moisture resistance of the interlayer film and the laminated glass is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more, more preferably 63% by mole or more and is preferably 85% by mole or less, more preferably 75% by mole or less, and further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, and more preferably 60% by mole or more and is preferably 75% by mole or less, and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The value represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

In 100% by weight of the thermoplastic resin contained in the interlayer film, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the thermoplastic resin of the interlayer film be a polyvinyl acetal resin.

(Compound which is Amphiphile or Surfactant)

The interlayer film contains an amphiphile or a surfactant (hereinafter, these together are sometimes described as a compound (0)).

The compound (0) is an amphiphile or a surfactant. The compound (0) may be an amphiphile or a surfactant.

The amphiphile means a compound having a hydrophilic group such as a carboxyl group, a sulfonium group, an aldehyde group, a keto group, an ammonium group, or a hydroxy group, and a hydrophobic group such as a hydrocarbon group. Examples of the amphiphile include monohydric alcohols such as ethanol and propanol; polyhydric alcohols such as dihydric alcohols such as ethylene glycol; alicyclic alcohols such as cyclohexanol; aromatic alcohols such as benzyl alcohol; alcohol derivatives such as hydroxy aldehyde, hydroxyketone, hydroxy acid, sterol, and terpenes; monocarboxylic acids such as acetic acid and stearic acid; multifunctional carboxylic acids such as dicarboxylic acids such as oxalic acid; aromatic carboxylic acids such as benzoic acid; unsaturated carboxylic acids such as acrylic acid;

carboxylic acid derivatives such as acyl compounds, acid amides, acid azides, acid chlorides, acid anhydrides, and nitriles; and carboxylic acids having a functional group other than a carboxyl group, such as a hydroxy acid, a keto acid, an aldehyde acid, a phenol acid, an amino acid, and a halogeno carboxylic acid.

Examples of the surfactant include, but are not particularly limited to, compounds generally used as a dispersant, an emulsifier, an antifoam, a lubricant, a penetrant, a cleaner, a builder, a hydrophobizing agent, a water repellent, a surface regulator, or a viscosity modifier. Examples of the surfactant include nonionic surfactants, cationic surfactants, amphoteric surfactants and anionic surfactants.

Examples of the nonionic surfactants include polyoxyalkylene alkyl ether such as polyoxyethylene lauryl ether; polyoxyalkylene alkyl ethers and polyoxyethylene derivatives such as polyoxyethylene alkylene alkyl ether, polyoxyethylene distyrenated phenyl ether, and polyoxyethylene polyoxypropylene glycol; sorbitan fatty acid esters such as sorbitan monolaurate; polyoxyalkylene sorbitan fatty acid esters such as polyoxyethylene sorbitan monolaurate; polyoxyalkylene sorbitol fatty acid esters such as polyoxyethylene sorbitol tetraoleate; glycerin fatty acid esters such as glycerol monostearate; polyoxyalkylene fatty acid esters such as polyethylene glycol monolaurate; polyoxyalkylene hydrogenated castor oil such as polyoxyethylene hydrogenated castor oil; polyoxyethylene alkylamines; and alkyl alkanol amides.

Examples of the cationic surfactants include alkyl amine salts such as coconut amine acetate; and quaternary ammonium salts such as lauryltrimethylammonium chloride.

Examples of the amphoteric surfactants include alkyl betaines such as lauryl betaine; and alkylamine oxides such as lauryldimethylamine oxide.

Examples of the anionic surfactants include alkyl sulfate such as sodium lauryl sulfate; polyoxyalkylene alkylether sulfate such as sodium polyoxyethylene laurylether sulfate; alkylbenzenesulfonic acid salts such as dodecylbenzene sulfonic acid; fatty acid soap; potassium salts such as potassium polyoxyethylenealkylether phosphate and dipotassium alkenylsuccinate; sodium salts such as sodium alkane sulfonate; polyoxyalkylene alkylphenylether phosphate esters such as polyoxyethylene octylphenylether phosphate ester, polyoxyethylene nonylphenylether phosphate ester, and polyoxyethylenelaurylphenylether phosphate ester; and phosphate esters such as trimethyl phosphate, triethyl phosphate, tributyl phosphate, tris(2-chloroethyl) phosphate, triphenyl phosphate, tricresyl phosphate, cresyl diphenyl phosphate, di-2-ethylhexyl phosphate, methyl acid phosphate, ethyl acid phosphate, propyl acid phosphate, isopropyl acid phosphate, butyl acid phosphate, lauryl acid phosphate, stearyl acid phosphate, 2-ethylhexyl acid phosphate, isodecyl acid phosphate, phenylphosphonic acid, polyoxyethyleneoctylphenylether phospahte ester, polyoxyethylenenonylphenylether phosphate ester, and polyoxyethylenelaurylphenylether phosphate ester.

The present inventors found that it is important to use an amphiphile or a surfactant to make the moisture resistance of laminated glass exposed to high temperature and high humidity uniform at one end and the other end of the interlayer film in a wedge-like shaped interlayer rather than in an interlayer film having a uniform thickness.

As the amphiphile or surfactant, a phosphate ester compound, and a lower alcohol having 4 or less carbon atoms are recited. As the lower alcohol, ethanol or the like is recited. From the viewpoint of effectively enhancing the moisture resistance under high temperature and high humidity, a phosphate ester compound is especially preferred.

In the interlayer film, the content of the compound (0) relative to 100 parts by weight of the thermoplastic resin (0) is referred to as a content (00). The content (00) is preferably 0.005 parts by weight or more, more preferably 0.01 parts by weight or more, and is preferably 20 parts by weight or less, and more preferably 5 parts by weight or less. When the content (00) is the above lower limit or more, the moisture resistance under high temperature and high humidity is further enhanced. When the content (00) is the above upper limit or less, foaming is less likely to occur in preparation of laminated glass, and adhesivity between the interlayer film and a lamination glass member is further improved.

In the first layer, the content of a compound (1) relative to 100 parts by weight of the thermoplastic resin (1) is referred to as a content (11). The content (11) is preferably 0.005 parts by weight or more, more preferably 0.01 parts by weight or more, and is preferably 20 parts by weight or less, and more preferably 5 parts by weight or less. When the content (11) is the above lower limit or more, the moisture resistance under high temperature and high humidity is further enhanced. When the content (11) is the above upper limit or less, foaming is less likely to occur in preparation of laminated glass, and adhesivity between the interlayer film and a lamination glass member is further improved.

In the second layer, the content of a compound (2) relative to 100 parts by weight of the thermoplastic resin (2) is referred to as a content (22). In the third layer, the content of a compound (3) relative to 100 parts by weight of the thermoplastic resin (3) is referred to as a content (33). Each of the content (22) and the content (33) is preferably 0.005 parts by weight or more, more preferably 0.01 parts by weight or more, and is preferably 20 parts by weight or less, and more preferably 5 parts by weight or less. When the content (22) and the content (33) are the above lower limit or more, the moisture resistance under high temperature and high humidity is further enhanced. When the content (22) and the content (33) are the above upper limit or less, foaming is less likely to occur in preparation of laminated glass, and adhesivity between the interlayer film and a lamination glass member is further improved.

(Plasticizer)

From the viewpoint of further enhancing the adhesive force of an interlayer film, it is preferred that the interlayer film contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in the interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

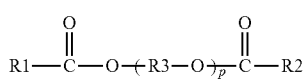

(1)

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

In the interlayer film, the content of the plasticizer (0) relative to 100 parts by weight of the thermoplastic resin (0) is referred to as content (0). The content (0) is preferably 25 parts by weight or more, more preferably 30 parts by weight or more, and is preferably 100 parts by weight or less, more preferably 60 parts by weight or less, further preferably 50 parts by weight or less. When the content (0) is the above lower limit or more, the penetration resistance of laminated glass is further enhanced. When the content (0) is the above upper limit or less, the transparency of the interlayer film is further enhanced.

In the first layer, the content of the plasticizer (1) relative to 100 parts by weight of the thermoplastic resin (1) is referred to as content (1). The content (1) is preferably 50 parts by weight or more, more preferably 55 parts by weight or more, further preferably 60 parts by weight or more, and is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

In the second layer, the content of the plasticizer (2) relative to 100 parts by weight of the thermoplastic resin (2) is referred to as content (2). In the third layer, the content of the plasticizer (3) relative to 100 parts by weight of the thermoplastic resin (3) is referred to as content (3). Each of the content (2) and the content (3) is preferably 10 parts by weight or more, more preferably 15 parts by weight or more, further preferably 20 parts by weight or more, especially preferably 24 parts by weight or more, and is preferably 40 parts by weight or less, more preferably 35 parts by weight or less, further preferably 32 parts by weight or less, especially preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

For the purpose of heightening the sound insulating properties of laminated glass, it is preferred that the content (1) be larger than the content (2) and it is preferred that the content (1) be larger than the content (3).

From the viewpoint of further heightening the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

(Heat Shielding Substance)

It is preferred that the interlayer film contain a heat shielding substance. It is preferred that the first layer contain a heat shielding substance. It is preferred that the second layer contain a heat shielding substance. It is preferred that the third layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

Ingredient X:

It is preferred that the interlayer film include at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. The Ingredient X is a heat shielding substance. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film or in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a first layer, a second layer, or a third layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, further preferred are ATO particles, ITO particles or tungsten oxide particles, and especially preferred are ITO particles or tungsten oxide particles. When the heat shielding particles contain ITO particles or tungsten oxide particles, the heat shielding particles may contain ITO particles and tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, or a third layer), the content of the heat shielding particles is preferably 0.01% by weight or more, more preferably 0.1% by weight or more, further preferably 1% by weight or more, especially preferably 1.5% by weight or more. In 100% by weight of the interlayer film, or in 100% by weight of a layer containing the heat shielding particles (a first layer, a second layer, or a third layer), the content of the heat shielding particles is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding properties are sufficiently enhanced and the visible light transmittance is sufficiently enhanced.

(Metal Salt)

It is preferred that the interlayer film contain at least one kind of metal salt (hereinafter, sometimes described as Metal salt M) among an alkali metal salt, an alkaline earth metal salt, and a magnesium salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, or a third layer) is preferably 5 ppm or more, more preferably 10 ppm or more, and further preferably 20 ppm or more and is preferably 300 ppm or less, more preferably 250 ppm or less, and further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a first layer, a second layer, or a third layer), the content of the ultraviolet ray screening agent is preferably 0.1% by weight or more, more preferably 0.2% by weight or more, further preferably 0.3% by weight or more, and especially preferably 0.5% by weight or more. In 100% by weight of the interlayer film or in 100% by weight of a layer containing the ultraviolet ray screening agent (a first layer, a second layer, or a third layer), the content of the ultraviolet ray screening agent is preferably 2.5% by weight or less, more preferably 2% by weight or less, further preferably 1% by weight or less, and especially preferably 0.8% by weight or less. When the content of the ultraviolet ray screening agent is the above-described lower limit or more and the above-described upper limit or less, deterioration in visible light transmittance after a lapse of a period can be further suppressed. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3, 5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy)(2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer (a first layer, a second layer or a third layer) containing the oxidation inhibitor. Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the interlayer film, the first layer, the second layer, and the third layer may contain additives such as a coupling agent, a dispersing agent, a surfactant, a flame retardant, an antistatic agent, a pigment, a dye, an adhesive force regulator other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film)

The distance between one end and the other end of the interlayer film is preferably 0.5 m or more, more preferably 0.8 m or more, and especially preferably 1 m or more, and is preferably 3 m or less, more preferably 2 m or less, and especially preferably 1.5 m or less. When the interlayer film has a lengthwise direction and a widthwise direction, the distance between one end and the other end is the distance in the lengthwise direction of the interlayer film. When the interlayer film has a square planar shape, the distance between one end and the other end is a distance between one end and the other end that are opposed to each other.

From the viewpoint of further improving the sound insulating properties of laminated glass when the interlayer film has a two or more-layer structure or a three or more-layer structure, the glass transition temperature of the first layer is preferably 30° C. or less, more preferably 20° C. or less, further preferably 10° C. or less. The glass transition temperature of the first layer is preferably −15° C. or more.

The glass transition temperature is measured in the following manner.

After storing an interlayer film at a temperature of 23° C. and a humidity of 30% for 1 month or more, a plurality of layers are isolated by peeling off and press-molded with a press molding machine to obtain an object to be measured in the case of a multi-layered interlayer film. With regard to the object to be measured, the measurement is performed using the "ARES-G2" available from TA Instruments. In this connection, when the interlayer film is a single-layered interlayer film, the interlayer film is cut so as to have a diameter of 8 mm to be measured. A parallel plate with a diameter of 8 mm is used as a jig, and the measurement is performed under the condition in which the temperature is decreased from 100° C. to −10° C. at a temperature decreasing rate of 3° C./minute and under the condition of a frequency of 1 Hz and a strain of 1%. In the measurement results obtained, the peak temperature of the loss tangent is defined as the glass transition temperature Tg (° C.).

The thickness of the interlayer film is not particularly limited. From the viewpoint of the practical aspect and the viewpoint of sufficiently heightening the heat shielding property, the average thickness of the interlayer film is preferably 0.1 mm or more, and more preferably 0.25 mm or more and is preferably 3 mm or less, and more preferably 1.5 mm or less. When the average thickness of the interlayer film is the above lower limit or more, the penetration resistance of laminated glass is enhanced. When the average thickness of the interlayer film is the above upper limit or less, the transparency of the interlayer film is further improved.

An average thickness of the interlayer film is designated as T. From the view point of making a void more difficult to be generated in an end part of laminated glass, and further suppressing deterioration in transparency of laminated glass in the case of a multi-layered interlayer film, the average thickness of the first layer is preferably 0.0625 T or more, more preferably 0.1 T or more, and is preferably 0.375 T or less, and more preferably 0.25 T or less.

From the view point of making a void more difficult to be generated in an end part of laminated glass, and further suppressing deterioration in transparency of laminated glass, the average thickness of each of the second layer and the third layer is preferably 0.625 T or more, more preferably 0.75 T or more, and is preferably 0.9375 T or less, and more preferably 0.9 T or less. When the average thickness of each of the second layer and the third layer is the above-described lower limit or more and the above-described upper limit or less, bleeding out of the plasticizer can be suppressed.

When the interlayer film includes the second layer and the third layer, a total of the average thickness of the second layer and the average thickness of the third layer is preferably 0.625 T or more, more preferably 0.75 T or more, and is preferably 0.9375 T or less, more preferably 0.9 T or less. When a total of the average thickness of the second layer and the average thickness of the third layer is the above-mentioned lower limit or more and the above-mentioned upper limit or less, a void becomes more difficult to be generated in an end part of the laminated glass, and deterioration in transparency of the laminated glass is further suppressed. When the total thickness of the second layer and the third layer is the above-described lower limit or more and the above-described upper limit or less, bleeding out of the plasticizer can be suppressed.

The interlayer film is not an interlayer film having a uniform thickness. The interlayer film is an interlayer film having a varying thickness. The sectional shape of the interlayer film is not a rectangle shape. The sectional shape of the interlayer film is a wedge-like shape.

The method for producing the interlayer film is not particularly limited. In the case of a single-layered interlayer film, examples of the production method of the interlayer film include a method of extruding a resin composition with an extruder. In the case of a multi-layered interlayer film, examples of the production method of the interlayer film include a method of separately forming respective resin compositions used for constituting respective layers into respective layers, and then layering the respective obtained layers, a method of coextruding respective resin compositions used for constituting respective layers with an extruder and layering the respective layers, and the like. A production method of extrusion-molding is preferred because the method is suitable for continuous production.

It is preferred that the second layer and the third layer contain the same polyvinyl acetal resin. It is more preferred that the second layer and the third layer contain the same polyvinyl acetal resin and the same plasticizer. It is further preferred that the second layer and the third layer be formed of the same resin composition. These cases realize excellent production efficiency of the interlayer film.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calender roll method, and a profile extrusion method. The emboss roll method is preferred because a large number of embosses of the protrusions and recesses, which is a quantitatively constant protrusion and recess pattern, can be formed.

(Laminated Glass)

FIG. 7 is a sectional view showing an example of a laminated glass prepared with the interlayer film for laminated glass shown in FIG. 1.

A laminated glass 21 shown in FIG. 7 includes the interlayer film 11, a first lamination glass member 22, and a second lamination glass member 23. The interlayer film 11 is arranged between the first lamination glass member 22 and the second lamination glass member 23 to be sandwiched therebetween. The first lamination glass member 22 is arranged on a first surface of the interlayer film 11. The second lamination glass member 23 is arranged on a second surface opposite to the first surface of the interlayer film 11.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. It is preferable that the laminated glass be a laminate provided with a glass plate and at least one glass plate be used. It is preferred that each of the first lamination glass member and the second lamination glass member be a glass plate or a PET (polyethylene terephthalate) film and the laminated glass include at least one glass plate as the first lamination glass member or the second lamination glass member. It is especially preferred that both of the first lamination glass member and the second lamination glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

Although respective thicknesses of the first lamination glass member and the second lamination glass member are not particularly limited, the thickness is preferably 1 mm or more and preferably 5 mm or less. When the lamination glass member is a glass plate, the thickness of the glass plate is preferably 1 mm or more and is preferably 5 mm or less. When the lamination glass member is a PET film, the thickness of the PET film is preferably 0.03 mm or more and is preferably 0.5 mm or less.

The method for producing the laminated glass is not particularly limited. For example, the interlayer film is sandwiched between the first and second lamination glass members, and then, passed through pressure rolls or subjected to decompression suction in a rubber bag. Therefore, the air remaining between the first lamination glass member and the interlayer film and between the second lamination glass member and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The laminated glass can be used for automobiles, railway vehicles, aircraft, ships, buildings, and the like. It is preferred that the laminated glass be laminated glass for buildings or for vehicles and it is more preferred that the laminated glass be laminated glass for vehicles. The laminated glass can also be used for applications other than these applications. The laminated glass can be used for a windshield, side glass, rear glass, or roof glass of an automobile, and the like. Since the laminated glass is high in heat shielding properties and is high in visible light transmittance, the laminated glass is suitably used for automobiles.

It is preferred that the laminated glass be a laminated glass serving as a head-up display (HUD). In the laminated glass serving as a HUD, measured information such as the speed which is sent from a control unit and the like can be projected onto the windshield from a display unit of the instrumental panel. Accordingly, without making a driver of an automobile move his or her visual field downward, a front visual field and measured information can be visually recognized simultaneously.

A head-up display system can be obtained by using the aforementioned head-up display. The head-up display system includes the laminated glass, and a light source device for irradiating the laminated glass with light for image display. The light source device can be attached, for example, to a dashboard in a vehicle. By irradiating the display region of the laminated glass with light from the light source device, it is possible to achieve image display.

Hereinafter, the present invention will be described in more detail with reference to examples and comparative examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

Example 1

Preparation of Composition for Forming First Layer:

The following ingredients were mixed, and kneaded sufficiently with a mixing roll to obtain a composition for forming a first layer.

Polyvinyl acetal resin (content of hydroxyl group: 22% by mole, acetylation degree: 13% by mole, acetalization degree: 65% by mole): 100 parts by weight Triethylene glycol di-2-ethylhexanoate (3GO): 60 parts by weight Tinuvin 326 (2-(2'-hydroxy-3'-t-butyl-5-methylphenyl)-5-chlorobenzotriazole, "Tinuvin 326" available from BASF Japan Ltd.): 0.2 parts by weight BHT (2,6-di-t-butyl-p-cresol): 0.2 parts by weight Preparation of Composition for Forming Second Layer and Third Layer:

The following ingredients were mixed, and kneaded sufficiently with a mixing roll to obtain a composition for forming a second layer and a third layer.

Polyvinyl acetal resin (content of hydroxyl group: 30.5% by mole, acetylation degree: 1% by mole, acetalization degree: 68.5% by mole): 100 parts by weight Phosphate ester ("Polyoxyethylenelaurylether phosphate ester", available from DKS Co., Ltd.): 0.015 parts by weight Triethylene glycol di-2-ethylhexanoate (3GO): 38.5 parts by weight Tinuvin 326 (2-(2'-hydroxy-3'-t-butyl-5-methylphenyl)-5-chlorobenzotriazole, "Tinuvin 326" available from BASF Japan Ltd.): 0.2 parts by weight BHT (2,6-di-t-butyl-p-cresol): 0.2 parts by weight An amount that is to be 0.2% by weight in the obtained interlayer film of a mixture of magnesium acetate and magnesium 2-ethylbutylate Preparation of Interlayer Film:

The composition for forming the first layer, and the composition for forming the second layer and the third layer were coextruded by using a co-extruder. A wedge-like shaped interlayer film having a multilayer structure of the second layer/the first layer/the third layer was prepared. The thickness of one end of the interlayer film was 803 µm. The thickness of the other end of the interlayer film was 1375 µm. The wedge angle of the interlayer film was 0.50 mrad. When the average thickness of the interlayer film is defined as T, the average thickness of the first layer was 0.124 T, and the total of the average thickness of the second layer and the average thickness of the third layer was 0.876 T. The average thickness of the second layer and the average thickness of the third layer were equivalent.

Preparation of Laminated Glass (A) (for Evaluation of Double Images):

Two glass plates (clear glass, the size of 510 mm×910 mm, 2.0 mm in thickness) was prepared. An interlayer film with a size corresponding to the size of the clear glass was sandwiched between the two clear glass plates to obtain a laminate. As shown in FIG. 8, the obtained laminate was fitted into a frame of an EPDM-made rubber tube (frame member). The rubber tube has a width of 15 mm. Next, the laminate fitted into a frame of an EPDM-made rubber tube was preliminarily press-bonded by a vacuum bag method. The preliminarily press-bonded laminate was subjected to press-bonding at 150° C. and a pressure of 1.2 MPa with the use of an autoclave to obtain a laminated glass (A).

Preparation of Laminated Glass (B) (for Evaluation of Moisture Resistance Under High Temperature and High Humidity, and for Evaluation of Adhesivity Under High Temperature and High Humidity):

Two sheets of green glass having a thickness of 2 mm that are in conformity with JIS R3208 were prepared. An interlayer film with a size corresponding to the size of the green glass was sandwiched between the two sheets of green glass to obtain a laminate. As shown in FIG. 8, the obtained laminate was fitted into a frame of an EPDM-made rubber tube (frame member). The rubber tube has a width of 15 mm. Next, the laminate fitted into a frame of an EPDM-made rubber tube was preliminarily press-bonded by a vacuum bag method. The preliminarily press-bonded laminate was subjected to press-bonding at 150° C. and a pressure of 1.2 MPa with the use of an autoclave to obtain a laminated glass (B).

Example 2

An interlayer film, a laminated glass (A) and a laminated glass (B) were obtained in the same manner as in Example 1 except that the thickness of the one end of the interlayer film was changed to 803 µm, the thickness of the other end of the interlayer film was changed to 1003 µm, and the wedge angle of the interlayer film was changed to 0.20 mrad.

Example 3

An interlayer film before addition of phosphate ester was obtained in the same manner as in Example 1 except that a phosphate ester was not mixed, and the thickness of the one end was changed to 800 µm. The one end side of the obtained interlayer film before addition of phosphate ester was dipped in a phosphate ester, and the one end side of the interlayer film was immersed with the phosphate ester, and thus an interlayer film containing phosphate ester was obtained. Also, a laminated glass (A) and a laminated glass (B) were obtained in the same manner as in Example 1.

Example 4

An interlayer film, a laminated glass (A) and a laminated glass (B) were obtained in the same manner as in Example 1 except that the mixing amount of the phosphate ester was changed to 0.005 parts by weight, and the thickness of the one end of the interlayer film was changed to 800 μm.

Example 5

An interlayer film, a laminated glass (A) and a laminated glass (B) were obtained in the same manner as in Example 1 except that a high molecular carboxylic acid ("MALI-ALIM AAB-0851" available from NOF) was mixed in place of phosphate ester, and the mixing amount of the high molecular carboxylic was 0.05 parts by weight, and the thickness of the one end of the interlayer film was changed to 800 μm.

Example 6

An interlayer film was obtained in the same manner as in Example 1 except that ITO (ITO particles, available from Mitsubishi Materials Corporation) which is a heat shielding substance was mixed in a composition for forming a second layer and a third layer in an amount that is to be 0.15% by weight in the obtained second layer and third layer, the thickness of the one end of the interlayer film was changed to 800 μm, and the thickness of the other end of the interlayer film was changed to 1310 μm. Also, a laminated glass (A) and a laminated glass (B) were obtained in the same manner as in Example 1.

Example 7

An interlayer film was obtained in the same manner as in Example 1 except that CWO (Cesium-doped tungsten oxide particles $Cs_{0.33}WO_3$) which is a heat shielding substance was mixed in a composition for forming a second layer and a third layer in an amount that is to be 0.06% by weight in the obtained second layer and third layer, the thickness of the one end of the interlayer film was changed to 800 μm, and the thickness of the other end of the interlayer film was changed to 1305 μm. Also, a laminated glass (A) and a laminated glass (B) were obtained in the same manner as in Example 1.

Comparative Example 1

An interlayer film, a laminated glass (A) and a laminated glass (B) were obtained in the same manner as in Example 1 except that a phosphate ester compound was not mixed.

Comparative Example 2

An interlayer film, a laminated glass (A) and a laminated glass (B) were obtained in the same manner as in Example 1 except that the mixing amount of the phosphate ester compound was changed to 0.001 parts by weight, the thickness of the one end of interlayer film was changed to 800 μm, the thickness of the other end of the interlayer film was changed to 1305 μm.

Reference Example 1

An interlayer film, a laminated glass (A) and a laminated glass (B) were obtained in the same manner as in Example 1 except that a phosphate ester compound was not mixed, the thickness of the other end of the interlayer film was changed to 803 μm, and the thickness of the interlayer film was made uniform.

(Evaluation)
(1) Double Images

The obtained laminated glass (A) was installed at a position of the windshield. The information to be displayed, which is emitted from a display unit (focal distance: 2 m and 3 m) installed below the laminated glass (A), was reflected by the sheet of laminated glass to visually confirm the presence or absence of double images at a prescribed position (the entire region for display). The double images were judged according to the following criteria.

[Criteria for Judgment on Double Images]
 ∘∘: Double images are not confirmed.
 ∘: Double images are confirmed very slightly and are at a level causing no problem in practical use.
 x: Not corresponding to the criteria of ∘∘ and ∘.

(2) Moisture Resistance Under High Temperature and High Humidity (Whitening Distance)

The obtained laminated glass (B) was left to stand at 80° C. and a relative humidity of 95% for 2 weeks. In the laminated glass after being left to stand, a distance in which whitening occurred inwardly from the one end of the interlayer film was measured, and the distance was determined as a whitening distance at the one end of the interlayer film. In the laminated glass after being left to stand, a distance in which whitening occurred inwardly from the other end of the interlayer film was measured, and the distance was determined as a whitening distance at the other end of the interlayer film.

A value A of (whitening distance at the other end of the interlayer film×thickness of the other end of the interlayer film)/(whitening distance at the one end of the interlayer film×thickness of the one end of the interlayer film) was determined An absolute value B of difference between a whitening distance at the one end of the interlayer film and a whitening distance at the other end of the interlayer film was determined.

(3) Adhesivity Under High Temperature and High Humidity

The obtained laminated glass (B) was left to stand at 80° C. and a relative humidity of 95% for 2 weeks. In the laminated glass after being left to stand, adhesivity at the one end of the interlayer film and at the other end of the interlayer film was evaluated in the following manner. The laminated glass was stored at a temperature of −18° C.±0.6° C. for 16 hours. The center part (part of 150 mm long×150 mm wide) of the laminated glass after storage was hit with a hammer with a head part of 0.45 kg, and crushed until the grain diameter of the glass was 6 mm or less. The easiness of delamination between the interlayer film and the green glass at this time was evaluated, and used as an index for the adhesivity. In Reference Example 1, evaluation of adhesivity under high temperature and high humidity was not conducted.

[Criteria for Judgment on Adhesivity Under High Temperature and High Humidity]
 ∘: There is little difference between the adhesivity at the one end of the interlayer film and the adhesivity at the other end of the interlayer film.
 Δ: There is slight difference between the adhesivity at the one end of the interlayer film and the adhesivity at the other end of the interlayer film.
 x: There is large difference between the adhesivity at the one end of the interlayer film and the adhesivity at the other end of the interlayer film.

The details and the results are shown in the following Tables 1, 2.

TABLE 1

|  |  |  |  | Example 1 | Example 2 | Example 3 | Example 4 | Example 5 |
|---|---|---|---|---|---|---|---|---|
| Configuration of interlayer film | Amphiphile/Surfactant | Use or nonuse | | Use | Use | Use | Use | Use |
|  |  | Kind | | Phosphate ester | Phosphate ester | Phosphate ester | Phosphate ester | High molecular carboxylic acid |
|  |  | Content per 100 parts by weight of polyvinyl acetal resin in first layer | part(s) by weight | 0.02 | 0.02 | 0.02 | 0.005 | 0.05 |
|  | Heat shielding substance | Use or nonuse | | Nonuse | Nonuse | Nonuse | Nonuse | Nonuse |
|  |  | Kind | | | | | | |
|  |  | Content in second layer and third layer | % by weight | | | | | |
|  | Thickness of one end | | μm | 803 | 803 | 800 | 800 | 800 |
|  | Thickness of other end | | μm | 1375 | 1003 | 1375 | 1375 | 1375 |
|  | Wedge angle | | mrad | 0.50 | 0.20 | 0.50 | 0.50 | 0.50 |
| Evaluation | Double images | | | ◯◯ | ◯◯ | ◯◯ | ◯◯ | ◯◯ |
|  | Moisture resistance under high temperature and high humidity | Whitening distance at one end of interlayer film | mm | 5 | 5 | 8 | 11.5 | 13 |
|  |  | Whitening distance at other end of interlayer film | mm | 4 | 5 | 6 | 6.5 | 7 |
|  |  | Value A* | | 1.37 | 1.25 | 1.29 | 0.97 | 0.93 |
|  |  | Absolute value B* | mm | 1 | 0 | 2 | 5 | 6 |
|  | Adhesivity under high temperature and high humidity | | | ◯ | ◯ | ◯ | Δ | ◯ |

Value A*: value of (whitening distance at other end of interlayer film × thickness at other end of interlayer film)/(whitening distance at one end of interlayer film × thickness at one end of interlayer film)
Absolute value B*: absolute value of difference between whitening distance at one end of interlayer film and whitening distance at other end of interlayer film

TABLE 2

|  |  |  |  | Example 6 | Example 7 | Comparative Example 1 | Comparative Example 2 | Reference Example 1 |
|---|---|---|---|---|---|---|---|---|
| Configuration of interlayer film | Amphiphile/Surfactant | Use or nonuse | | Use | Use | Nonuse | Use | Nonuse |
|  |  | Kind | | Phosphate ester | Phosphate ester | | Phosphate ester | |
|  |  | Content per 100 parts by weight of polyvinyl acetal resin in first layer | part(s) by weight | 0.02 | 0.02 | | 0.001 | |
|  | Heat shielding substance | Use or nonuse | | Use | Use | Nonuse | Nonuse | Nonuse |
|  |  | Kind | | ITO | CWO | | | |
|  |  | Content in second layer and third layer | % by weight | 0.15 | 0.06 | | | |
|  | Thickness of one end | | μm | 800 | 800 | 803 | 800 | 803 |
|  | Thickness of other end | | μm | 1310 | 1305 | 1375 | 1305 | 803 |
|  | Wedge angle | | mrad | 0.50 | 0.50 | 0.50 | 0.50 | 0 |
| Evaluation | Double images | | | ◯◯ | ◯◯ | ◯◯ | ◯◯ | x |
|  | Moisture resistance under high temperature and high humidity | Whitening distance at one end of interlayer film | mm | 3 | 3 | 12.5 | 12 | 12.5 |
|  |  | Whitening distance at other end of interlayer film | mm | 2 | 2 | 5 | 4.5 | 12.5 |
|  |  | Value A* | | 1.09 | 1.09 | 0.68 | 0.61 | 1.00 |
|  |  | Absolute value B* | mm | 1 | 1 | 7.5 | 7.5 | 0 |
|  | Adhesivity under high temperature and high humidity | | | ◯ | ◯ | x | x | — |

Value A*: value of (whitening distance at other end of interlayer film × thickness at other end of interlayer film)/(whitening distance at one end of interlayer film × thickness at one end of interlayer film)
Absolute value B*: absolute value of difference between whitening distance at one end of interlayer film and whitening distance at other end of interlayer film In this connection, sheets of laminated glass prepared with interlayer films obtained in Examples 1 to 7 respectively were evaluated for the sound insulating properties with sound transmission losses, and as a result, it was confirmed that the sheets were excellent in sound insulating properties.

While the results of Examples of multi-layered interlayer films have been shown, it was confirmed that the moisture resistance and the adhesivity of the laminated glass having been exposed to high temperature and high adhesivity can be made uniform at one end and the other end of the interlayer film even in a single-layered interlayer film containing a compound which is a phosphate ester, a high molecular carboxylic acid or a surfactant as in Examples 1 to 7.

EXPLANATION OF SYMBOLS 1, 1A, 1B, 10, 1D, 1E: First layer
1Aa, 1Ca, 1Ea: Portion having sectional shape in thickness direction of rectangular shape
1Ab, 1Cb, 1Eb: Portion having sectional shape in thickness direction of wedge-like shape
2, 2B, 2D: Second layer
3, 3B, 3D: Third layer 11, 11A, 11B, 11C, 11D, 11E: Interlayer film
11a: One end
11b: Other end
11Aa, 11Ca, 11Ea: Portion having sectional shape in thickness direction of rectangular shape
11Ab, 11Cb, 11Eb: Portion having sectional shape in thickness direction of wedge-like shape
21: Laminated glass
22: First lamination glass member
23: Second lamination glass member
R1: Region for display
R2: Surrounding region
R3: Shading region

The invention claimed is:

1. An interlayer film for laminated glass, being wedge-like shaped and having one end and the other end being at the opposite side of the one end, the other end having a thickness that is larger than a thickness of the one end,
the interlayer film containing a combination of (1) a polyvinyl acetal resin
consisting of a polyvinyl acetal resin (X) which is obtained by acetalizing polyvinyl alcohol with an aldehyde, the aldehyde consisting of at least one of propionaldehyde, n-butyraldehyde and isobutyraldehyde; and
(2) a plasticizer consisting of at least one of triethylene glycol di-2-ethylhexanoate and triethylene glycol di-2-ethylbutyrate,
the interlayer film containing an amphiphile or a surfactant,
the interlayer film being an interlayer film having a whitening distance at the one end of the interlayer film of 15 mm or less, and a whitening distance at the other end of the interlayer film of 15 mm or less, and showing a value of (whitening distance at the other end of the interlayer film×thickness of the other end of the interlayer film)/(whitening distance at the one end of the interlayer film×thickness of the one end of the interlayer film) of 0.70 or more, when the whitening distance at the one end of the interlayer film is more than 0 mm, when a high temperature and high humidity test for laminated glass is executed,
the high temperature and high humidity test for laminated glass including: preparing two sheets of green glass having a thickness of 2 mm that are in conformity with JIS R3208; obtaining a laminated glass by sandwiching the interlayer film between the two sheets of green glass; leaving the obtained laminated glass to stand at 80° C. and a relative humidity of 95% for 2 weeks; measuring, in the laminated glass after being left to stand, a distance in which whitening occurs inwardly from the one end of the interlayer film, and determining the distance as a whitening distance at the one end of the interlayer film; and measuring, in the laminated glass after being left to stand, a distance in which whitening occurs inwardly from the other end of the interlayer film, and determining the distance as a whitening distance at the other end of the interlayer film.

2. The interlayer film for laminated glass according to claim 1, wherein an absolute value of difference between the whitening distance at the one end of the interlayer film and the whitening distance at the other end of the interlayer film is 5 mm or less when the high temperature and high humidity test is executed.

3. The interlayer film for laminated glass according to claim 1, having a wedge angle of 0.2 mrad or more.

4. The interlayer film for laminated glass according to claim 1, containing a heat shielding substance.

5. The interlayer film for laminated glass according to claim 1, including:
a first layer; and
a second layer arranged on a first surface side of the first layer.

6. The interlayer film for laminated glass according to claim 5, wherein
the first layer contains a polyvinyl acetal resin consisting of the polyvinyl acetal resin (X),
the second layer contains a polyvinyl acetal resin consisting of the polyvinyl acetal resin (X), and
a content of a hydroxyl group of the polyvinyl acetal resin in the first layer is lower than a content of a hydroxyl group of the polyvinyl acetal resin in the second layer.

7. The interlayer film for laminated glass according to claim 5, wherein
the first layer contains a polyvinyl acetal resin consisting of the polyvinyl acetal resin (X),
the second layer contains a polyvinyl acetal resin consisting of the polyvinyl acetal resin (X),
the first layer contains a plasticizer consisting of at least one of triethylene glycol di-2-ethylhexanoate and triethylene glycol di-2-ethylbutyrate,
the second layer contains a plasticizer consisting of at least one of triethylene glycol di-2-ethylhexanoate and triethylene glycol di-2-ethylbutyrate, and
a content of the plasticizer in the first layer relative to 100 parts by weight of the polyvinyl acetal resin in the first layer is larger than a content of the plasticizer in the second layer relative to 100 parts by weight of the polyvinyl acetal resin in the second layer.

8. The interlayer film for laminated glass according to claim 5, wherein when the interlayer film has an average thickness T, the first layer has an average thickness of 0.0625T or more and 0.375T or less.

9. The interlayer film for laminated glass according to claim 1, that is used for laminated glass that is a head-up display.

10. A laminated glass, comprising: a first lamination glass member; a second lamination glass member; and the interlayer film for laminated glass according to claim 1,
the interlayer film being arranged between the first lamination glass member and the second lamination glass member.

11. The interlayer film for laminated glass according to claim 1, wherein
the polyvinyl acetal resin in the interlayer film consists of a polyvinyl butyl resin (X1) which is obtained by acetalizing polyvinyl alcohol with an aldehyde, the aldehyde consisting of at least one of n-butyraldehyde and isobutyraldehyde.

12. The interlayer film for laminated glass according to claim 1, wherein
the polyvinyl acetal resin in the interlayer film consists of a polyvinyl butyral resin (X2) which is obtained by acetalizing polyvinyl alcohol with an aldehyde, the aldehyde consisting of n-butyraldehyde.

13. The interlayer film for laminated glass according to claim 1, wherein
the plasticizer in the interlayer film consists of triethylene glycol di-2-ethylhexanoate.

14. The interlayer film for laminated glass according to claim 1, further comprising an oxidation inhibitor comprising at least one of a phenol-based oxidation inhibitor and a phosphorous-based oxidation inhibitor.

15. The interlayer film for laminated glass according to claim 14, wherein the oxidation inhibitor comprises both a phenol-based oxidation inhibitor and a phosphorous-based oxidation inhibitor, and a total content of the oxidation inhibitor is 0.1% by weight or more and 2% by weight or less in 100% by weight of the interlayer film.

16. A laminated glass, comprising a first lamination glass member, a second lamination glass member and an interlayer film for laminated glass, the interlayer film being arranged between the first lamination glass member and the second lamination glass member, the interlayer film being an interlayer film for laminated glass, being wedge-like shaped and having one end and the other end being at the opposite side of the one end, the other end having a thickness that is larger than a thickness of the one end, the interlayer film containing a combination of (1) a polyvinyl acetal resin consisting of a polyvinyl acetal resin (X) which is obtained by acetalizing polyvinyl alcohol with an aldehyde, the aldehyde consisting of at least one of propionaldehyde, n-butyraldehyde and isobutyraldehyde; and (2) a plasticizer consisting of at least one of triethylene glycol di-2-ethylhexanoate and triethylene glycol di-2-ethylbutyrate, the interlayer film containing an amphiphile or a surfactant, the laminated glass being a laminated glass having a whitening distance at the one end of the interlayer film of 15 mm or less, and a whitening distance at the other end of the interlayer film of 15 mm or less, and showing a value of (whitening distance at the other end of the interlayer film×thickness of the other end of the interlayer film)/(whitening distance at the one end of the interlayer film×thickness of the one end of the interlayer film) of 0.70 or more, when the whitening distance at the one end of the interlayer film is more than 0 mm, when a high temperature and high humidity test for laminated glass is executed, the high temperature and high humidity test for laminated glass including: leaving the laminated glass to stand at 80° C. and a relative humidity of 95% for 2 weeks; measuring, in the laminated glass after being left to stand, a distance in which whitening occurs inwardly from the one end of the interlayer film, and determining the distance as a whitening distance at the one end of the interlayer film; and measuring, in the laminated glass after being left to stand, a distance in which whitening occurs inwardly from the other end of the interlayer film, and determining the distance as a whitening distance at the other end of the interlayer film.

* * * * *